United States Patent
Li

(10) Patent No.: US 12,156,192 B2
(45) Date of Patent: *Nov. 26, 2024

(54) COMMUNICATION METHOD AND APPARATUS, TERMINAL, BASE STATION, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,230

(22) Filed: Dec. 12, 2023

(65) Prior Publication Data
US 2024/0188063 A1    Jun. 6, 2024

Related U.S. Application Data

(63) Continuation of application No. 17/278,089, filed as application No. PCT/CN2018/106793 on Sep. 20, 2018, now Pat. No. 11,902,954.

(51) Int. Cl.
*H04W 72/00* (2023.01)
*H04L 5/00* (2006.01)
(Continued)

(52) U.S. Cl.
CPC ......... *H04W 72/046* (2013.01); *H04L 5/0048* (2013.01); *H04W 72/23* (2023.01)

(58) Field of Classification Search
CPC ... H04W 72/046; H04W 72/23; H04W 76/27; H04L 5/0048; H04L 5/0053;
(Continued)

(56) References Cited

U.S. PATENT DOCUMENTS 11,239,925 B2 * 2/2022 Kim ............... H04W 24/08
2019/0253308 A1   8/2019 Huang
(Continued)

FOREIGN PATENT DOCUMENTS

CN   106130609 A   11/2016
CN   106385710 A    2/2017
(Continued)

OTHER PUBLICATIONS

English version of International Search Report in International Application No. PCT/CN2018/106793, mailed on Jun. 19, 2019.
(Continued)

*Primary Examiner* — Hashim S Bhatti
(74) *Attorney, Agent, or Firm* — Finnegan, Henderson, Farabow, Garrett & Dunner, L.L.P.

(57) ABSTRACT

Disclosed are a communication method and apparatus, a terminal, a base station, and a storage medium, belonging to the technical field of communications. The method includes: receiving beam indication signaling sent by a base station, wherein the beam indication signaling is used for indicating a plurality of target beams or a target group of beams; determining, according to the beam indication signaling, the plurality of target beams or the target group of beams; and performing multi-beam based data transmission with the base station based on the plurality of target beams. Since a terminal determines a plurality of target beams based on the beam indication signaling, multi-beam based data transmission is performed between the terminal and the base station, thereby improving communication robustness.

20 Claims, 13 Drawing Sheets

(51) Int. Cl.
*H04W 72/044* (2023.01)
*H04W 72/23* (2023.01)

(58) Field of Classification Search
CPC .. H04B 7/0408; H04B 7/06966; H04B 7/088; H04B 7/0695
See application file for complete search history.

(56) References Cited

U.S. PATENT DOCUMENTS

| | | | | |
|---|---|---|---|---|
| 2019/0297640 | A1* | 9/2019 | Liou | H04L 5/001 |
| 2020/0100232 | A1* | 3/2020 | Onggosanusi | H04W 72/046 |
| 2020/0389883 | A1* | 12/2020 | Faxér | H04L 5/0053 |

FOREIGN PATENT DOCUMENTS

| | | |
|---|---|---|
| CN | 106470065 A | 3/2017 |
| CN | 106797625 A | 5/2017 |
| CN | 106888507 A | 6/2017 |
| CN | 107645322 A | 1/2018 |
| CN | 107889220 A | 4/2018 |
| CN | 108024365 A | 5/2018 |
| CN | 108111267 A | 6/2018 |
| WO | WO 2018/082435 A1 | 5/2018 |

OTHER PUBLICATIONS

English version of Written Opinion of the International Search Authority in the International Application No. PCT/CN2018/106793, mailed on Jun. 19, 2019.

First Office Action of Chinese Application No. 201880001421.2, issued on Feb. 22, 2021.

Second Office Action of Chinese Application No. 201880001421.2, issued on May 18, 2021.

Third Office Action of Chinese Application No. 201880001421.2, issued on Aug. 12, 2021.

ZTE et al: "Discussion on beam management", 3GPP TSG RAN WG1 Meeting #90-bis, R1-1717424, Prague, Czechia, Oct. 9-13, 2017, pp. 1-12.

Extended European Search Report in European Application No. 18934515.0, mailed on May 9, 2022.

\* cited by examiner

COMMUNICATION METHOD AND APPARATUS, TERMINAL, BASE STATION, AND STORAGE MEDIUM

CROSS REFERENCE TO RELATED APPLICATIONS

This application is a continuation of U.S. application Ser. No. 17/278,089, filed Mar. 19, 2021, now U.S. Pat. No. 11,902,954, which is a national phase application based on International Application No. PCT/CN2018/106793, filed Sep. 20, 2018, the contents of both of which are incorporated herein by reference.

TECHNICAL FIELD

The disclosure relates to the technical field of communication, and in particular to a communication method and apparatus, a terminal, a base station, and a storage medium.

BACKGROUND

In a New Radio (NR) communication system of the $5^{th}$-Generation (5G) mobile communication technology, in order to achieve data transmission with a higher rate and lower latency, the communication band of a carrier between a base station and a terminal is getting higher. For a high communication band, especially communication bands above 6 GHz, due to the faster attenuation of the carrier, the terminal needs to send and receive data based on beams when communicating with the base station, so as to ensure coverage.

At present, during communication between the base station and the terminal, the base station determines a target beam for the terminal and informs the terminal of the target beam; and the terminal transmits data to the base station through the target beam.

SUMMARY

The embodiments of the disclosure provide a communication method and apparatus, a terminal, a base station, and a storage medium, which can solve the problem of low robustness of communication. The technical solutions are as follows:

According to a first aspect of the embodiments of the disclosure, provided is a communication method, applied to a terminal, and the method including: receiving a beam indication signaling from a base station, wherein the beam indication signaling is configured to indicate a plurality of target beams or a target group of beams; determining, according to the beam indication signaling, the plurality of target beams or the target group of beams; and performing multi-beam based data transmission with the base station based on the plurality of target beams or the target group of beams.

In a possible implementation, the beam indication signaling is a first medium access control (MAC) signaling, and the first MAC signaling is configured to indicate a beam group identifier of the target group of beams that are to be activated.

In another possible implementation, before receiving the beam indication signaling from the base station, the method further includes: receiving a first radio resource control (RRC) signaling from the base station, wherein the first RRC signaling is configured to indicate a plurality of pieces of beam group information, each piece of beam group information includes a beam group identifier and a plurality of reference signal (RS) identifiers in a group of beams, and each of the plurality of RS identifiers is configured to indicate a respective beam in the group of beams; and determining, according to the beam indication signaling, the plurality of target beams or the target group of beams includes: acquiring, according to the beam group identifier of the target group of beams, a plurality of RS identifiers in the target group of beams from the plurality of pieces of beam group information indicated by the first RRC signaling; and acquiring a plurality of target beams indicated by the plurality of RS identifiers in the target group of beams.

In another possible implementation, the beam indication signaling is a second MAC signaling, and the second MAC signaling is configured to indicate beam identifiers of a plurality of target beams that are to be activated.

In another possible implementation, before receiving the beam indication signaling from the base station, the method further includes: receiving a second RRC signaling from the base station, wherein the second RRC signaling is configured to indicate a plurality of pieces of beam information, each piece of beam information includes a beam identifier and an RS identifier corresponding to a beam, and the RS identifier is configured to indicate the beam; and determining, according to the beam indication signaling, the plurality of target beams or the target group of beams includes: acquiring, according to the beam identifiers of the plurality of target beams, a plurality of RS identifiers corresponding to the plurality of target beams from the plurality of pieces of beam information indicated by the second RRC signaling; and acquiring the plurality of target beams indicated by the plurality of RS identifiers corresponding to the plurality of target beams.

In another possible implementation, the beam indication signaling is a first downlink control information (DCI) signaling, and the first DCI signaling is configured to indicate beam identifiers of the plurality of target beams.

In another possible implementation, before receiving the beam indication signaling from the base station, the method further includes: receiving a third RRC signaling from the base station, wherein the third RRC signaling is configured to indicate a plurality of pieces of beam information, each piece of beam information includes a beam identifier and an RS identifier corresponding to a beam, and the RS identifier is configured to indicate the beam; and determining, according to the beam indication signaling, the plurality of target beams or the target group of beams includes: acquiring, according to the beam identifiers of the plurality of target beams, a plurality of RS identifiers corresponding to the plurality of target beams from the plurality of pieces of beam information indicated by the third RRC signaling; and acquiring the plurality of target beams indicated by the plurality of RS identifiers corresponding to the plurality of target beams.

In another possible implementation, before receiving the beam indication signaling from the base station, the method further includes: receiving a third RRC signaling and a third MAC signaling from the base station, herein the third RRC signaling is configured to indicate a plurality of pieces of beam information, each piece of beam information includes a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling; and determining, according to the beam indication signaling, the plurality of target beams or the target group of beams includes: acquiring, according to the beam identifiers of the plurality of beams that are to be activated indicated by the third MAC signaling, RS identifiers of the plurality of beams that are to be activated from the plurality of pieces of beam information indicated by the third RRC signaling; acquiring, according to the beam identifiers of the plurality of target beams, a plurality of RS identifiers corresponding to the plurality of target beams from the RS identifiers of the plurality of beams that are to be activated indicated by the third MAC signaling; and acquiring the plurality of target beams indicated by the plurality of RS identifiers corresponding to the plurality of target beams.

In another possible implementation, the beam indication signaling is a second DCI signaling, and the second DCI signaling is configured to indicate a beam group identifier of the target group of beams.

In another possible implementation, before receiving the beam indication signaling from the base station, the method further includes: receiving a fourth RRC signaling from the base station, wherein the fourth RRC signaling is configured to indicate a plurality of pieces of beam group information, each piece of beam group information includes a beam group identifier and a plurality of RS identifiers in a group of beams, and each of the plurality of RS identifiers is configured to indicate a respective beam in the group of beams; and determining, according to the beam indication signaling, the plurality of target beams or the target group of beams includes: acquiring, according to the beam group identifier of the target group of beams, a plurality of RS identifiers in the target group of beams from the plurality of pieces of beam group information indicated by the fourth RRC signaling; and acquiring a plurality of target beams indicated by the plurality of RS identifiers in the target group of beams.

In another possible implementation, before receiving the beam indication signaling from the base station, the method further includes: receiving a fourth RRC signaling and a fourth MAC signaling from the base station, wherein the fourth RRC signaling is configured to indicate a plurality of pieces of beam group information, each piece of beam group information includes a beam group identifier and a plurality of RS identifiers in a group of beams, each of the plurality of RS identifiers is configured to indicate a respective beam in the group of beams, and the fourth MAC signaling is configured to indicate beam group identifiers of a plurality groups of beams that are to be activated among groups of beams indicated by the fourth RRC signaling; and determining, according to the beam indication signaling, the plurality of target beams or the target group of beams includes: acquiring, according to the beam group identifiers of the plurality groups of beams that are to be activated indicated by the fourth MAC signaling, the plurality groups of beams that are to be activated from the plurality of pieces of beam group information indicated by the fourth RRC signaling; acquiring, according to the beam group identifier of the target group of beams, a plurality of RS identifiers in the target group of beams from the plurality groups of beams that are to be activated indicated by the fourth MAC signaling; and acquiring a plurality of target beams indicated by the plurality of RS identifiers in the target group of beams.

In another possible implementation, after receiving the beam indication signaling from the base station, the method further includes: performing data transmission with the base station; and when the data transmission is performed within a preset duration since the beam indication signaling is received, acquiring a default target group of beams or one or more default target beams.

In another possible implementation, the method further includes: when the data transmission is performed after a preset duration since the beam indication signaling is received, performing the operation of determining, according to the beam indication signaling, the plurality of target beams or the target group of beams.

According to a second aspect of the embodiments of the disclosure, provided is a communication method is provided, applied to a base station, and the method including: determining a plurality of target beams or a target group of beams for multi-beam transmission with a terminal; generating a beam indication signaling according to the plurality of target beams or the target group of beams, wherein the beam indication signaling is configured to indicate the plurality of target beams or the target group of beams; and sending the beam indication signaling to the terminal, wherein the beam indication signaling is used for the terminal to determine the plurality of target beams or the target group of beams, and to perform multi-beam based data transmission with the base station based on the plurality of target beams or the target group of beams.

In a possible implementation, the beam indication signaling is a first medium access control (MAC) signaling, and the first MAC signaling is configured to indicate a beam group identifier of the target group of beams that are to be activated.

In another possible implementation, before sending the beam indication signaling to the terminal, the method further includes: sending a first radio resource control (RRC) signaling to the terminal, wherein the first RRC signaling is configured to indicate a plurality of pieces of beam group information, each piece of beam group information includes a beam group identifier and a plurality of RS identifiers in a group of beams, and each of the plurality of RS identifiers is configured to indicate a respective beam in the group of beams.

In another possible implementation, the beam indication signaling is a second MAC signaling, and the second MAC signaling is configured to indicate beam identifiers of a plurality of target beams that are to be activated.

In another possible implementation, before sending the beam indication signaling to the terminal, the method further includes: sending a second RRC signaling to the terminal, wherein the second RRC signaling is configured to indicate a plurality of pieces of beam information, each piece of beam information includes a beam identifier and an RS identifier corresponding to a beam, and the RS identifier is configured to indicate the beam.

In another possible implementation, the beam indication signaling is a first downlink control information (DCI) signaling, and the first DCI signaling is configured to indicate beam identifiers of the plurality of target beams.

In another possible implementation, before sending the beam indication signaling to the terminal, the method further includes: sending a third RRC signaling to the terminal, wherein the third RRC signaling is configured to indicate a plurality of pieces of beam information, each piece of beam information includes a beam identifier and an RS identifier corresponding to a beam, and the RS identifier is configured to indicate the beam.

In another possible implementation, before sending the beam indication signaling to the terminal, the method further includes: sending a third RRC signaling and a third MAC signaling to the terminal, wherein the third RRC signaling is configured to indicate a plurality of pieces of beam information, each piece of beam information includes a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling.

In another possible implementation, the beam indication signaling is a second DCI signaling, and the second DCI signaling is configured to indicate a beam group identifier of the target group of beams.

In another possible implementation, before sending the beam indication signaling to the terminal, the method further includes: sending a fourth RRC signaling to the terminal, wherein the fourth RRC signaling is configured to indicate a plurality of pieces of beam group information, each piece of beam group information includes a beam group identifier and a plurality of RS identifiers in a group of beams, and each of the plurality of RS identifiers is configured to indicate a respective beam in the group of beams.

In another possible implementation, before sending the beam indication signaling to the terminal, the method further includes: sending a fourth RRC signaling and a fourth MAC signaling to the terminal, wherein the fourth RRC signaling is configured to indicate a plurality of pieces of beam group information, each piece of beam group information includes a beam group identifier and a plurality of RS identifiers in a group of beams, each of the plurality of RS identifiers is configured to indicate a respective beam in the group of beams, and the fourth MAC signaling is configured to indicate beam group identifiers of a plurality groups of beams that are to be activated among groups of beams indicated by the fourth RRC signaling.

According to a third aspect of the embodiments of the disclosure, a communication apparatus is provided. The apparatus is applied to a terminal, and the apparatus includes: a first receiving module, configured to receive a beam indication signaling from a base station, wherein the beam indication signaling is configured to indicate a plurality of target beams or a target group of beams; a first determination module, configured to determine, according to the beam indication signaling, the plurality of target beams or the target group of beams; and a first transmission module, configured to perform multi-beam based data transmission with the base station based on the plurality of target beams or the target group of beams.

In a possible implementation, the beam indication signaling received by the first receiving module is a first medium access control (MAC) signaling, and the first MAC signaling is configured to indicate a beam group identifier of the target group of beams that are to be activated.

In another possible implementation, the apparatus further includes: a second receiving module, configured to receive a first radio resource control (RRC) signaling from the base station, wherein the first RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams; and the first determination module is configured to acquire, according to the beam group identifier of the target group of beams, a plurality of RS identifiers in the target group of beams from the plurality of pieces of beam group information indicated by the first RRC signaling; and the first determination module is further configured to acquire a plurality of target beams indicated by the plurality of RS identifiers in the target group of beams.

In another possible implementation, the beam indication signaling received by the first receiving module is a second MAC signaling, and the second MAC signaling is configured to indicate beam identifiers of the plurality of target beams that are to be activated.

In another possible implementation, the apparatus further includes: a third receiving module, configured to receive a second RRC signaling from the base station, wherein the second RRC signaling is configured to indicate a plurality of pieces of beam information, each piece of beam information includes a beam identifier and an RS identifier corresponding to a beam, and the RS identifier is configured to indicate the beam; and the first determination module is configured to acquire, according to the beam identifiers of the plurality of target beams, a plurality of RS identifiers corresponding to the plurality of target beams from the plurality of pieces of beam information indicated by the second RRC signaling; and the first determination module is further configured to acquire the plurality of target beams indicated by the plurality of RS identifiers corresponding to the plurality of target beams.

In another possible implementation, the beam indication signaling received by the first receiving module is a first downlink control information (DCI) signaling, and the first DCI signaling is configured to indicate beam identifiers of the plurality of target beams.

In another possible implementation, the apparatus further includes: a fourth receiving module, configured to receive a third RRC signaling from the base station, wherein the third RRC signaling is configured to indicate a plurality of pieces of beam information, each piece of beam information includes a beam identifier and an RS identifier corresponding to a beam, and the RS identifier is configured to indicate the beam; and the first determination module is configured to acquire, according to the beam identifiers of the plurality of target beams, a plurality of RS identifiers corresponding to the plurality of target beams from the plurality of pieces of beam information indicated by the third RRC signaling; and the first determination module is further configured to acquire the plurality of target beams indicated by the plurality of RS identifiers corresponding to the plurality of target beams.

In another possible implementation, the apparatus further includes: a fifth receiving module, configured to receive a third RRC signaling and a third MAC signaling from the base station, wherein the third RRC signaling is configured to indicate a plurality of pieces of beam information, each piece of beam information includes a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling; and the first determination module is configured to acquire, according to the beam identifiers of the plurality of beams that are to be activated indicated by the third MAC signaling, RS identifiers of the plurality of beams that are to be activated from the plurality of pieces of beam information indicated by the third RRC signaling; the first determination module is further configured to acquire, according to the beam identifiers of the plurality of target beams, a plurality of RS identifiers corresponding to the plurality of target beams from the RS identifiers of the plurality of beams that are to be activated indicated by the third MAC signaling; and the first determination module is further configured to acquire the plurality of target beams indicated by the plurality of RS identifiers corresponding to the plurality of target beams.

In another possible implementation, the beam indication signaling received by the first receiving module is a second DCI signaling, and the second DCI signaling is configured to indicate a beam group identifier of the target group of beams.

In another possible implementation, the apparatus further includes: a sixth receiving module, configured to receive a fourth RRC signaling from the base station, wherein the fourth RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams;

the first determination module is configured to acquire, according to the beam group identifier of the target group of beams, a plurality of RS identifiers in the target group of beams from the plurality of pieces of beam group information indicated by the fourth RRC signaling; and the first determination module is further configured to acquire a plurality of target beams indicated by the plurality of RS identifiers in the target group of beams.

In another possible implementation, the apparatus further includes: a seventh receiving module, configured to receive a fourth RRC signaling and a fourth MAC signaling from the base station, wherein the fourth RRC signaling is configured to indicate a plurality of pieces of beam group information, each piece of beam group information includes a beam group identifier and a plurality of RS identifiers in the group of beams, each of the plurality of RS identifiers is configured to indicate a respective beam in the group of beams, and the fourth MAC signaling is configured to indicate beam group identifiers of a plurality groups of beams that are to be activated among groups of beams indicated by the fourth RRC signaling; and the first determination module is configured to acquire, according to the beam group identifiers of the plurality groups of beams that are to be activated indicated by the fourth MAC signaling, the plurality groups of beams that are to be activated from the plurality of pieces of beam group information indicated by the fourth RRC signaling; the first determination module is further configured to acquire, according to the beam group identifier of the target group of beams, a plurality of RS identifiers in the target group of beams from the plurality groups of beams that are to be activated indicated by the fourth MAC signaling; and the first determination module is further configured to acquire a plurality of target beams indicated by the plurality of RS identifiers in the target group of beams.

In another possible implementation, the apparatus further includes: a second transmission module, configured to perform data transmission with the base station; and the first determination module is configured to: when the data transmission is performed within a preset duration since the beam indication signaling is received, acquire a default target group of beams or one or more default target beams.

In another possible implementation, the first determination module is configured to: when the data transmission is performed after a preset duration since the beam indication signaling is received, determine, according to the beam indication signaling, the plurality of target beams or the target group of beams.

According to a fourth aspect of the embodiments of the disclosure, provided is a communication apparatus. The apparatus is applied to a base station, and includes: a second determination module, configured to determine a plurality of target beams or a target group of beams for multi-beam transmission with a terminal; a generation module, configured to generate a beam indication signaling according to the plurality of target beams or the target group of beams, wherein the beam indication signaling is configured to indicate the plurality of target beams or the target group of beams; and a first sending module, configured to send the beam indication signaling to the terminal, wherein the beam indication signaling is used for the terminal to determine the plurality of target beams or the target group of beams, and to perform multi-beam based data transmission with the base station based on the plurality of target beams or the target group of beams.

In a possible implementation, the beam indication signaling sent by the first sending module is a first medium access control (MAC) signaling, and the first MAC signaling is configured to indicate a beam group identifier of the target group of beams that are to be activated.

In another possible implementation, the apparatus further includes: a second sending module, configured to send a first radio resource control (RRC) signaling to the terminal, wherein the first RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams.

In another possible implementation, the beam indication signaling sent by the first sending module is a second MAC signaling, and the second MAC signaling is configured to indicate beam identifiers of the plurality of target beams that are to be activated.

In another possible implementation, the apparatus further includes: a third sending module, configured to send a second RRC signaling to the terminal, wherein the second RRC signaling is configured to indicate a plurality of pieces of beam information, each piece of beam information includes a beam identifier and an RS identifier corresponding to a beam, and the RS identifier is configured to indicate the beam.

In another possible implementation, the beam indication signaling sent by the first sending module is a first downlink control information (DCI) signaling, and the first DCI signaling is configured to indicate beam identifiers of the plurality of target beams.

In another possible implementation, the apparatus further includes: a fourth sending module, configured to send a third RRC signaling to the terminal, wherein the third RRC signaling is configured to indicate a plurality of pieces of beam information, each piece of beam information includes a beam identifier and an RS identifier corresponding to a beam, and the RS identifier is configured to indicate the beam.

In another possible implementation, the apparatus further includes: a fifth sending module, configured to send a third RRC signaling and a third MAC signaling to the terminal, wherein the third RRC signaling is configured to indicate a plurality of pieces of beam information, each piece of beam information includes a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling.

In another possible implementation, the beam indication signaling sent by the first sending module is a second DCI signaling, and the second DCI signaling is configured to indicate a beam group identifier of the target group of beams.

In another possible implementation, the apparatus further includes: a sixth sending module, configured to send a fourth RRC signaling to the terminal, wherein the fourth RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams.

In another possible implementation, the apparatus further includes: a seventh sending module, configured to send a fourth RRC signaling and a fourth MAC signaling to the terminal, wherein the fourth RRC signaling is configured to indicate a plurality of pieces of beam group information, each piece of beam group information includes a beam group identifier and a plurality of RS identifiers in the group of beams, each of the plurality of RS identifiers is configured to indicate a respective beam in the group of beams, and the fourth MAC signaling is configured to indicate beam group identifiers of a plurality groups of beams that are to be activated among groups of beams indicated by the fourth RRC signaling According to a fifth aspect of the embodiments of the disclosure, a terminal is provided, including: a processor; and a memory configured to store processor-executable instructions, wherein the processor is configured to: receive a beam indication signaling from a base station, wherein the beam indication signaling is configured to indicate a plurality of target beams or a target group of beams; determine, according to the beam indication signaling, the plurality of target beams or the target group of beams; and perform multi-beam based data transmission with the base station based on the plurality of target beams or the target group of beams.

According to a sixth aspect of the embodiments of the disclosure, a base station is provided, including: a processor; and a memory configured to store processor-executable instructions, where the processor is configured to: determine a plurality of target beams or a target group of beams for multi-beam transmission with a terminal; generating a beam indication signaling according to the plurality of target beams or the target group of beams, wherein the beam indication signaling is configured to indicate the plurality of target beams or the target group of beams; and send the beam indication signaling to the terminal, wherein the beam indication signaling is used for the terminal to determine the plurality of target beams or the target group of beams, and to perform multi-beam based data transmission with the base station based on the plurality of target beams or the target group of beams.

According to a seventh aspect of the embodiments of the disclosure, provided is a computer-readable storage medium having instructions stored thereon, wherein the instructions are executed by a processor to implement the communication method described in any possible implementation of the first aspect.

According to an eighth aspect of the embodiments of the disclosure, provided is a computer-readable storage medium having instructions stored thereon, wherein the instructions are executed by a processor to implement the communication method described in any possible implementation of the second aspect.

The beneficial effects of the technical solutions provided by the embodiments of the disclosure are: the terminal determines the plurality of target beams or the target group of beams according to the beam indication signaling, and performs multi-beam based data transmission with the base station based on the plurality of target beams or the target group of beams. Since a plurality of target beams are determined by the terminal based on the beam indication signaling, multi-beam based data transmission can be performed between the terminal and the base station, thereby improving robustness of communication.

BRIEF DESCRIPTION OF THE DRAWINGS

In order to illustrate the technical solutions in the embodiments of the disclosure more clearly, the drawings used in the description of the embodiments will be briefly introduced below. Apparently, the drawings in the following description are only some embodiments of the disclosure. For the skilled person in the art, other drawings may be obtained from these drawings without creative work.

DETAILED DESCRIPTION

In order to make the objectives, technical solutions and advantages of the disclosure more clear, the embodiments of the disclosure will be described in further detail below in conjunction with the drawings.

Figure 1:
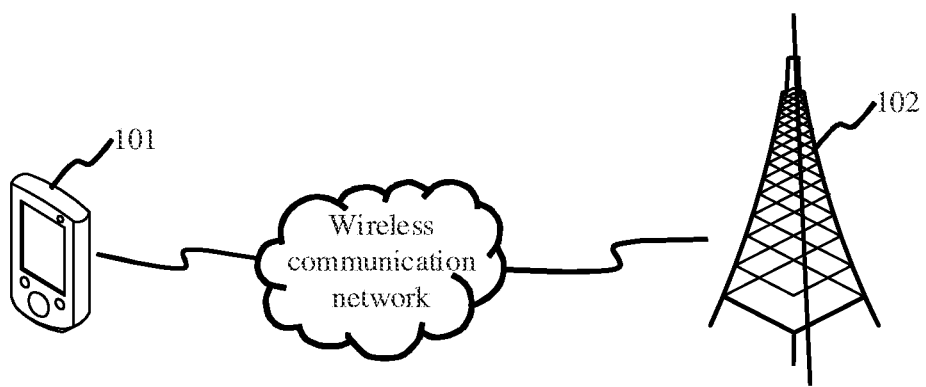
FIG. 1 illustrates a schematic diagram of an implementation environment provided in the embodiments of the disclosure.

FIG. 1 illustrates a schematic diagram of architecture of a communication system provided in the embodiments of the disclosure. As illustrated in FIG. 1, the system architecture includes a terminal 101 and a base station 102. The terminal 101 and the base station 102 are connected through a wireless communication network, and the base station 102 informs, through a beam indication signaling, the terminal 101 of multiple target beams to be used in data transmission. Multi-beam based data transmission is performed between the terminal 101 and the base station 102 based on the multiple target beams.

The beam indication signaling is configured to indicate a plurality of target beams or a target group of beams. In a possible implementation, a first RRC signaling is configured to indicate a plurality of pieces of beam group information, each piece of beam group information including a beam group identifier and a plurality of RS identifiers in the group of beams, and each of the plurality of RS identifiers is configured to indicate a respective beam in the group of beams. Correspondingly, the beam indication signaling is a first MAC signaling, and the first MAC signaling is configured to indicate a beam group identifier of the target group of beams that are to be activated among a plurality groups of beams indicated by the first RRC signaling.

In another possible implementation, a second RRC signaling is configured to indicate a plurality of pieces of beam information, each piece of beam information includes a beam identifier and an RS identifier corresponding to a beam, and the RS identifier is configured to indicate the beam. Correspondingly, the beam indication signaling is a second MAC signaling, and the second MAC signaling is configured to indicate beam identifiers of a plurality of target beams that are to be activated among a plurality of beams indicated by the second RRC signaling.

In another possible implementation, a third RRC signaling is configured to indicate a plurality of pieces of beam information. Correspondingly, the beam indication signaling is first DCI signaling, and the first DCI signaling is configured to indicate beam identifiers of a plurality of target beams among a plurality of beams indicated by the third RRC signaling.

In another possible implementation, a third RRC signaling is configured to indicate a plurality of pieces of beam information, and a third MAC signaling is configured to indicate beam identifiers of a plurality of beams that are to be activated among a plurality of beam identifiers indicated by the third RRC signaling. Correspondingly, the beam indication signaling is a first DCI signaling, and the first DCI signaling is configured to indicate beam identifiers of a plurality of target beams among the plurality of beams that are to be activated indicated by the third MAC signaling.

In another possible implementation, a fourth RRC signaling is configured to indicate a plurality of pieces of beam group information. Correspondingly, the beam indication information is a second DCI signaling, and the second DCI signaling is configured to indicate a beam group identifier of a target group of beams among a plurality groups of beams indicated by the fourth RRC signaling.

In another possible implementation, a fourth RRC signaling is configured to indicate a plurality of pieces of beam group information, and a fourth MAC signaling is configured to indicate beam group identifiers of a plurality groups of beams that are to be activated among the groups of beams indicated by the fourth RRC signaling. Correspondingly, the beam indication information is a second DCI signaling, and the second DCI signaling is configured to indicate a beam group identifier of a target group of beams among the plurality groups of beams that are to be activated indicated by the fourth MAC signaling.

Herein, the system architecture may be a 5G wireless communication system. The terminal 101 may be a handheld device, a vehicle-mounted device, a wearable device and a computing device with a wireless communication function, or other processing devices connected to a wireless modem, etc. In the embodiments of the disclosure, the terminal 101 is not specifically limited.

Figure 2:
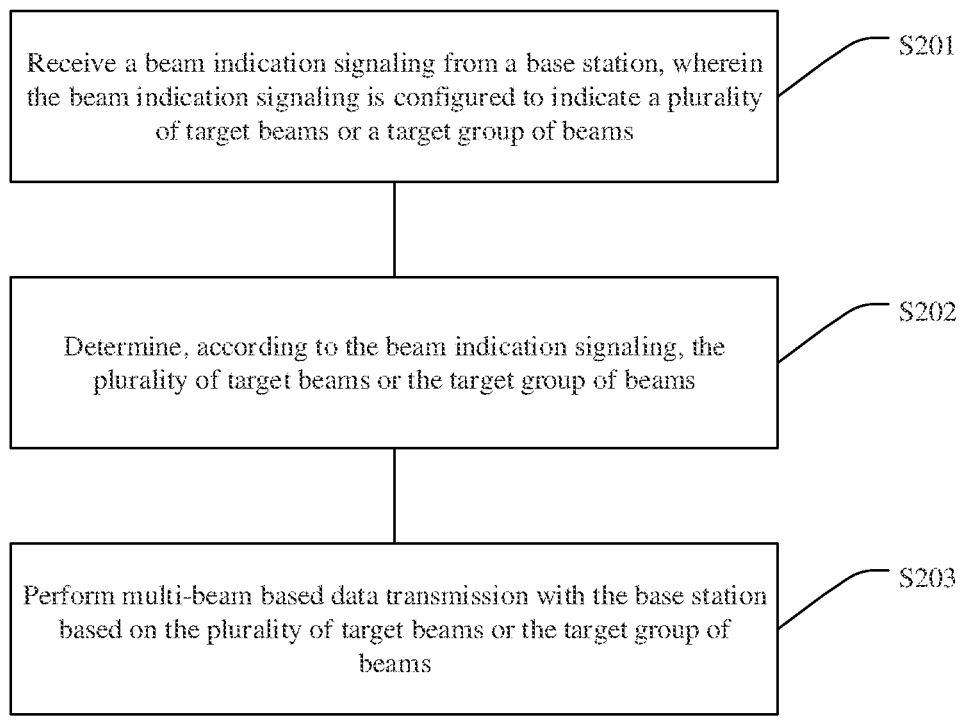
FIG. 2 illustrates a flowchart of a communication method applied to a terminal provided in the embodiments of the disclosure.

FIG. 2 illustrates a flowchart of a communication method applied to a terminal provided in the embodiments of the disclosure. As illustrated in FIG. 2, the embodiment includes the following actions S201 to S203.

In S201, a beam indication signaling is received from a base station. The beam indication signaling is configured to indicate a plurality of target beams or a target group of beams.

In S202, the plurality of target beams or the target group of beams are determined according to the beam indication signaling.

In S203, multi-beam based data transmission is performed with the base station based on the plurality of target beams or the target group of beams.

The terminal determines the plurality of target beams or the target group of beams according to the beam indication signaling, and performs multi-beam based data transmission with the base station based on the plurality of target beams or the target group of beams. Since a plurality of target beams are determined by a terminal based on the beam indication signaling, multi-beam based data transmission can be performed between the terminal and the base station, thereby improving robustness of communication.

Herein, it should be noted that "data" in multi-beam based data transmission mentioned here includes but is not limited to a Physical Downlink Control Channel (PDCCH), a Physical Uplink Control Channel (PUCCH), a Physical Downlink Shared Channel (PDSCH), a Physical Uplink Shared Channel (PUSCH), and various reference signals such as a Synchronization Signal Block (SSB), a Channel State Information Reference Signal (CSI-RS), a Sounding Reference Signal (SRS), etc.

Figure 3:
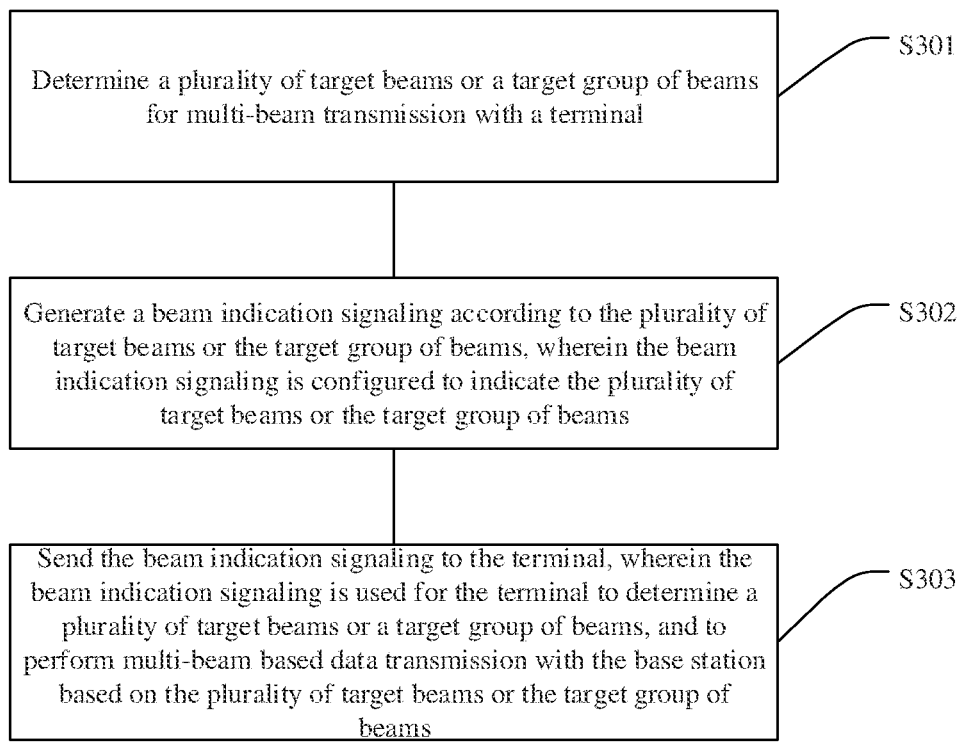
FIG. 3 illustrates a flowchart of a communication method applied to a base station provided in the embodiments of the disclosure.

FIG. 3 illustrates a flowchart of a communication method applied to a base station provided in the embodiments of the disclosure. As illustrated in FIG. 3, the embodiment includes the following actions S301 to S303.

In S301, a plurality of target beams or a target group of beams for multi-beam transmission with a terminal is determined.

In S302, a beam indication signaling is generated according to the plurality of target beams or the target group of beams. The beam indication signaling is configured to indicate the plurality of target beams or the target group of beams.

In S303, the beam indication signaling is sent to the terminal. The beam indication signaling is used for the terminal to determine the plurality of target beams or the target group of beams, and to perform multi-beam based data transmission with the base station based on the plurality of target beams or the target group of beams.

The terminal determines the plurality of target beams or the target group of beams according to the beam indication signaling, and performs multi-beam based data transmission with the base station based on the plurality of target beams or the target group of beams. Since a plurality of target beams are determined by the terminal based on the beam indication signaling, multi-beam based data transmission can be performed between the terminal and the base station, thereby improving robustness of communication.

Figure 4:
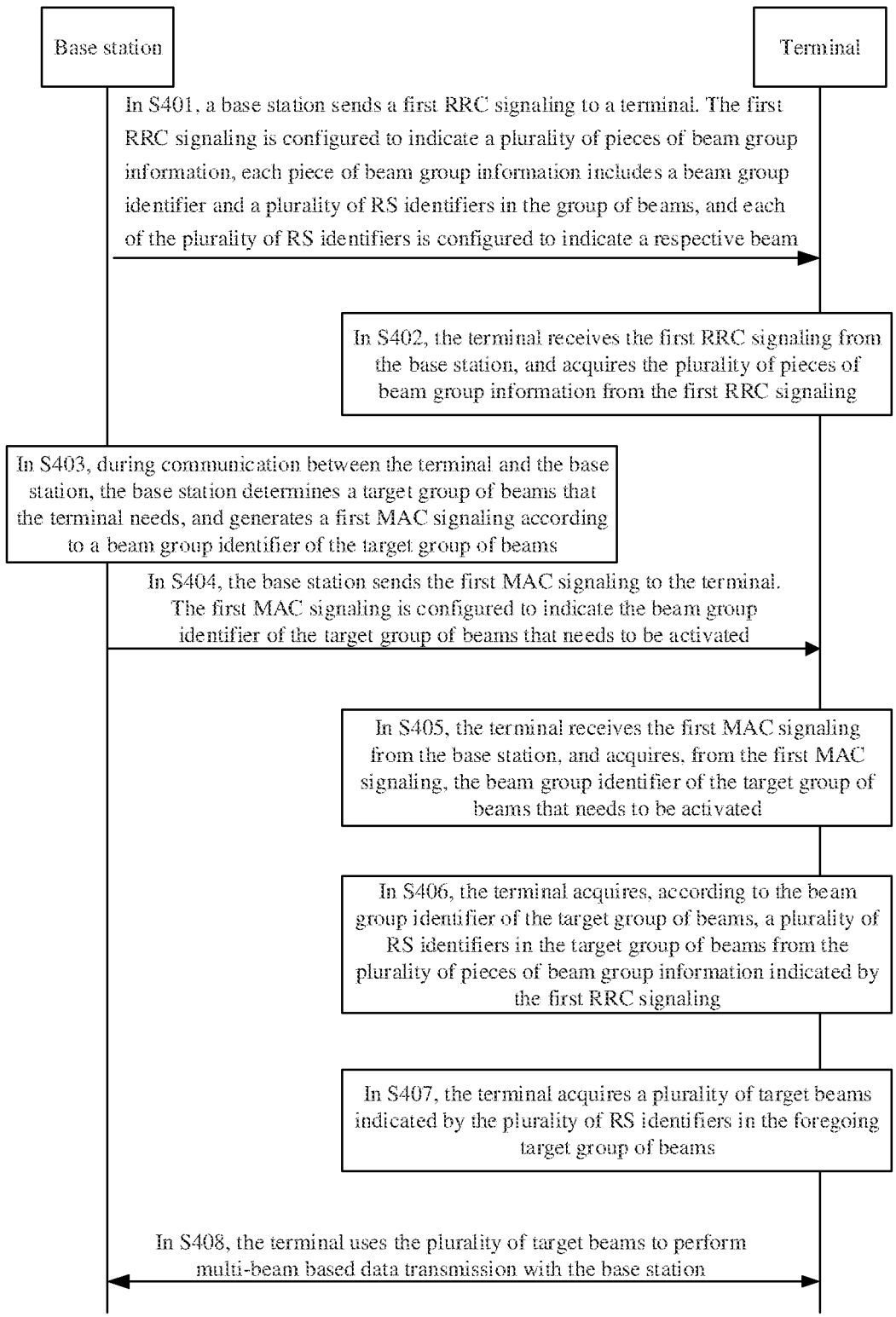
FIG. 4 illustrates a flowchart of application of a communication method provided in the embodiments of the disclosure.

FIG. 4 illustrates a flowchart of an application of a communication method provided in the embodiments of the disclosure. In the embodiments of the disclosure, description is made with an example that the first RRC signaling indicates a plurality of pieces of beam group information, and the beam indication signaling is a first MAC signaling. The first MAC signaling indicates the beam group identifier of the target group of beams that are to be activated among a plurality groups of beams indicated by the first RRC signaling. As illustrated in FIG. 4, the procedure of the method provided in the disclosure includes S401 to S408.

In S401, a base station sends a first RRC signaling to a terminal. The first RRC signaling is configured to indicate a plurality of pieces of beam group information. Each piece of beam group information includes a beam group identifier and a plurality of RS identifiers in a group of beams. Each of the plurality of RS identifiers is configured to indicate a respective beam in the group of beams.

This action may be achieved through the following operations (1) to (3):

(1) the base station divides a plurality of beams of the terminal into a plurality beam groups.

Each beam group includes a plurality of beams, and the number of beams included in each beam group may be equal or unequal, which is not specifically limited in the embodiments of the disclosure.

In a first implementation, the base station may divide the plurality of beams into a plurality beam groups randomly or sequentially.

In a second implementation, due to the limitation of the beam directions of the terminal, certain two beams cannot be used simultaneously. The terminal may report, to the base station, first grouping information of the beams that can be used simultaneously. Correspondingly, operation (1) may be: the base station divides a plurality of beams into a plurality beam groups according to the first grouping information.

In a third implementation, the terminal may report, to the base station, second grouping information of beams that cannot be simultaneously used. Correspondingly, operation (1) may be: the base station divides a plurality of beams into a plurality beam groups according to the second grouping information.

(2) The base station determines a plurality of pieces of beam group information of the plurality groups of beams.

For each beam group, the base station determines a beam group identifier of the beam group, and RS identifiers corresponding to a plurality of beams in the beam group, and composes the beam group information of the beam group by the beam group identifier of the beam group and the RS identifiers in the beam group. Herein, the beam group identifier may be a serial number of the beam group. For example, when serial number of a beam is a serial number of a Transmission Configuration Indication (TCI), the serial number of the beam group can be a serial number of a TCI group; when a serial number of a beam is a serial number of spatial relationship information (spatialrelationinfo), a serial number of a beam group may be a serial number of a spatialrelationinfo group. The RS may be an SSB, a CSI-RS or a SRS, and the RS identifier may be an SSB index, a CSI-RS ID, an SRS ID, or the like, which are not specifically limited in the embodiments of the disclosure.

For example, the downlink transmission beams supported by the base station includes 36 beams, namely beam 0 to beam 35, and the RS identifiers corresponding to the 36 beams are RS #0 to RS #35. For a RS corresponding to each beam, the terminal has its own most suitable reception beam. When the beam identifier indicated by the beam indication signaling sent from the base station is beam 0, the terminal is notified to use the reception beam indicated by the RS corresponding to beam 0 to receive the subsequent data. The data here may be a PDCCH, a PDSCH, or the like. The base station divides the 36 beams into 18 beam groups in sequence, and each beam group includes 2 beams. The beam group identifiers of the 18 beam groups are beam group #0 to beam group #17. Multiple pieces of beam group information are shown in Table 1 below:

TABLE 1

| Beam group identifier | RS identifiers |
|---|---|
| beam group #0 | RS #0 and RS #1 |
| beam group #1 | RS #2 and RS #3 |
| ... | ... |
| beam group #17 | RS #34 and RS #35 |

(3) The base station sends a first RRC signaling to the terminal, and the first RRC signaling is configured to indicate the plurality of pieces of beam group information.

In a possible implementation, after the base station sends the first RRC signaling to the terminal, the terminal may directly selects the target group of beams according to the first RRC signaling and the beam indication signaling subsequently. Therefore, after the terminal accesses the base station, operation S401 only needs to be performed once.

In another possible implementation, since the location of the terminal may change, the reception beam or transmitting beam most suitable for the terminal may change. Therefore, the base station may add, delete or group a plurality of beams again at an interval of a preset duration, update the first RRC signaling, and send the updated first RRC signaling to the terminal. The preset duration may be set and changed as needed. The preset duration is not specifically limited in the embodiments of the disclosure.

In S402, the terminal receives the first RRC signaling from the base station, and acquires the plurality of pieces of beam group information from the first RRC signaling.

When receiving the first RRC signaling from the base station, the terminal parses the first RRC signaling to acquire the plurality of pieces of beam group information from the first RRC signaling. For example, the first RRC signaling indicates M pieces of beam group information, M being a positive integer. The identifiers of the M beam groups are beam group #0, beam group #1, beam group #2 . . . beam group #(M−1), each beam group including 2 beams. Then the terminal acquires, from the first RRC signaling, the beam group identifiers of the M beam groups and a plurality of RS identifiers in the M beam groups.

In S403, during communication between the terminal and the base station, the base station determines a target group of beams that the terminal needs, and generates first MAC signaling according to a beam group identifier of the target group of beams.

This action may be achieved through the following operations (1) and (2):

(1) during communication between the terminal and the base station, the base station determines a target group of beams that the terminal needs.

When the terminal needs to transmit data to the base station or when the base station needs to send data to the terminal, the base station determines the target group of beams that the terminal needs from the plurality groups of beams indicated by the first RRC signaling sent to the terminal. Herein, the base station may select, according to the measurement result for each beam sent by the terminal, a target group of beams with the best measurement result from the plurality groups of beams indicated by the first RRC signaling. Herein, the data that the terminal needs to send to the base station may be a PUCCH, a PUSCH or an SRS; the data that the base station needs to send to the terminal may be a PDCCH, a PDSCH, an SSB, or a CSI-RS.

Herein, a better measurement result indicates a higher Layer1-Reference Signal Received Power (L1-RSRP), or a higher Layer1-Reference Signal Received Quality (L1-RSRQ).

(2) The base station carries the beam group identifier of the target group of beams in the first MAC signaling.

The first MAC signaling includes multiple fields, and the base station uses the multiple fields to identify the beam group identifier of the target group of beams. For example, when the first RRC signaling indicates at most 64 beam groups, the number of bits in the first MAC signaling for indicating the beam group that are to be activated is 6, and 6 bits can exactly indicate any one of the 64 groups. That is, when the 6 bits are 000000, it is indicated that the beam group identifier of the target group of beams is beam group #0; when the 6 bits are 000001, it is indicated that the beam group identifier of the target group of beams is beam group #1; when the 6 bits are 000010, it is indicated that the beam group identifier of the target group of beams is beam group #2, and so on.

In S404, the base station sends the first MAC signaling to the terminal. The first MAC signaling is configured to indicate the beam group identifier of the target group of beams that are to be activated.

In S405, the terminal receives the first MAC signaling from the base station, and acquires, from the first MAC signaling, the beam group identifier of the target group of beams that are to be activated.

When receiving the first MAC signaling from the base station, the terminal parses the first MAC signaling, and acquires, from the first MAC signaling, the beam group identifier of the target group of beams that are to be activated. If the terminal needs to perform data transmission with the base station within a preset duration after receiving the first MAC signaling, the terminal may acquire a beam group identifier of a default target group of beams.

If the data to be transmitted between the terminal and the base station is PDCCH or PUCCH, the operation that the terminal acquires the beam group identifier of the default target group of beams may be: if the first RRC signaling is configured to indicate a plurality of pieces of beam group information, the terminal selects a smallest beam group identifier from the first RRC signaling.

Exemplarily, the example in the action S402 above is continued. For example, if the base station determines to use the first beam group, the first MAC signaling indicates that the beam group identifier of a target group of beams that are to be activated is beam group #0.

In S406, the terminal acquires, according to the beam group identifier of the target group of beams, a plurality of RS identifiers in the target group of beams from the plurality of pieces of beam group information indicated by the first RRC signaling.

The first MAC signaling carries the beam group identifier of the target group of beams that are to be activated, and the terminal uses the beam group identifier to determine the target group of beams corresponding to the beam group identifier that are to be activated among the plurality groups of beams, and acquires the plurality of RS identifiers in the target group of beams. Herein, if the target group of beams is applied to downlink reception such as PDCCH reception, the target group of beams is a TCI state group. If the target group of beams is used for uplink transmission such as PUCCH transmission, the target group of beams is a spatialrelationinfo state group.

Exemplarily, the example of operation S405 above is continued. The first MAC signaling indicates the beam group identifier of a target group of beams that are to be activated is beam group #0, and the terminal determines, through the beam group identifier of the target group of beams, that the plurality of RS identifiers in the target group of beams are RS #0 and RS #1, respectively.

In S407, the terminal acquires a plurality of target beams indicated by the plurality of RS identifiers in the foregoing target group of beams.

The terminal stores the correspondences between the RS identifiers and the beams. Correspondingly, this action may be: the terminal acquires the plurality of target beams indicated by the plurality of RS identifiers from the correspondences between the RS identifiers and the beams according to the plurality of RS identifiers.

Exemplarily, the example of operation S406 above is continued. The terminal determines, through the acquired RS identifiers RS #0 and RS #1, that a plurality of target beams corresponding to RS #0 and RS #1 are beam 0 and beam 1. For example, the base station periodically sends RS #0 in advance, the terminal uses each receiving beam of its own to receive RS #0 respectively, and finally finds that the received power is the strongest when using beam #0 to receive RS #0; therefore, the beam corresponding to RS #0 is stored as beam #0. When the RS corresponding to the beam identifier indicated by the beam indication signaling sent from the base station is RS #0, it means that the base station indicates the terminal to use the beam with best performance in receiving RS #0 (i.e., beam #0) to receive the following PDCCH or PDSCH.

In S408, the terminal uses the plurality of target beams to perform multi-beam based data transmission with the base station.

When the terminal transmits data to the base station, the terminal uses the plurality of target beams for data transmission. When the terminal receives data from the base station, the terminal uses the plurality of target beams for data reception.

In the embodiments of the disclosure, the first RRC signaling is configured to indicate a plurality of pieces of beam group information. The beam indication signaling is a first MAC signaling, and the first MAC signaling indicates the beam group identifier of the target group of beams that are to be activated among a plurality groups of beams indicated by the first RRC signaling. The solution is suitable for indicating beams for PDCCH reception, or PUCCH transmission, or SSB reception, or CSI-RS reception, or SRS transmission. The terminal parses out the plurality of target beams according to the first RRC signaling and the first MAC signaling, and then performs multi-beam based data transmission based on the plurality of target beams, thereby improving robustness of communication.

Figure 5:
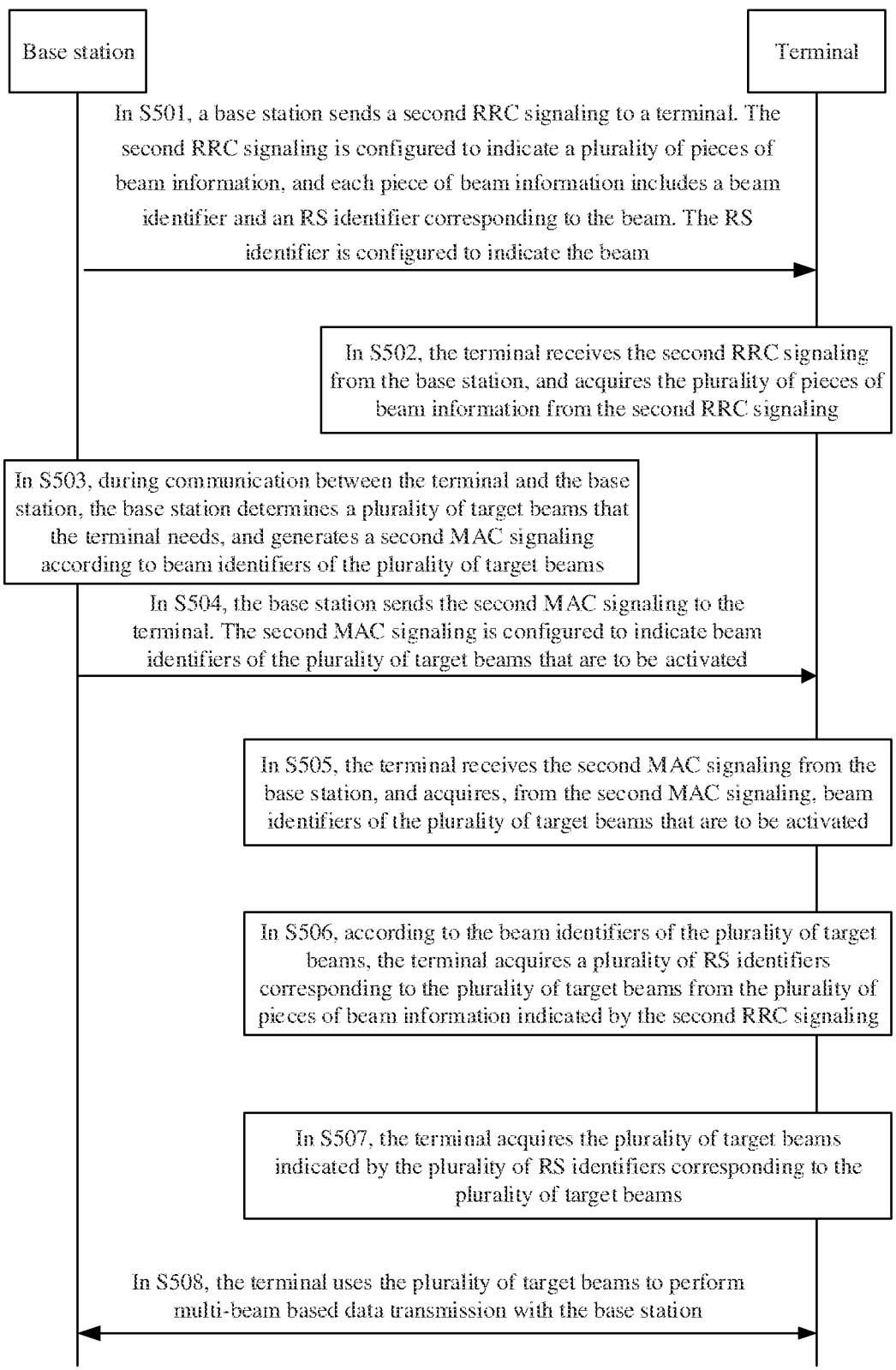
FIG. 5 illustrates a flowchart of another application of a communication method application provided by the embodiments of the disclosure.

FIG. 5 illustrates a flowchart of an application of a communication method provided in the embodiments of the disclosure. In the embodiments of the disclosure, description is made with an example that the second RRC signaling indicates a plurality of pieces of beam information, the beam indication signaling is the second MAC signaling. The second MAC signaling is configured to indicate beam identifiers of a plurality of target beams that are to be activated among a plurality of beams indicated by the second RRC signaling. As illustrated FIG. 5, the procedure of the method provided in the disclosure includes S501 to S508.

In S501, a base station sends a second RRC signaling to a terminal. The second RRC signaling is configured to indicate a plurality of pieces of beam information, and each piece of beam information includes a beam identifier and an RS identifier corresponding to a beam. The RS identifier is configured to indicate the beam.

For example, X pieces of beam information are indicated in the second RRC signaling. X is a positive integer.

Before data transmission is performed between the terminal and the base station, the base station sends a second RRC signaling to the terminal. The second RRC signaling may be sent when the terminal accesses the base station, or may be sent at any time before data transmission is performed between the terminal and the base station. The timing for the base station to send the second RRC signaling to the terminal is not specifically limited in the embodiments of the disclosure.

In S502, the terminal receives the second RRC signaling from the base station, and acquires the plurality of pieces of beam information from the second RRC signaling.

When receiving the second RRC signaling from the base station, the terminal parses the second RRC signaling, and acquires the plurality of pieces of beam information from the second RRC signaling. For example, the terminal parses the second RRC signaling to obtain X pieces of beam information.

It should be noted that after the base station sends the second RRC signaling to the terminal, in subsequent data transmission with the base station, the terminal can always perform beam selection based on the plurality of pieces of beam information indicated by the second RRC signaling, unless an updated second RRC signaling is received from the base station again. Therefore, action S501 and action S502 only need to be executed once.

In S503, before data transmission is performed between the terminal and the base station, the base station determines a plurality of target beams that the terminal needs, and generates a second MAC signaling according to beam identifiers of the plurality of target beams.

This action can be achieved through the following operations (1) and (2):

(1) Before data transmission is performed between the terminal and the base station, the base station determines the plurality of target beams that the terminal needs.

Before data transmission is performed between the terminal and the base station, the operation that the base station determines the plurality of target beams that the terminal needs may be implemented in any one of the following two implementations.

In a first implementation, before this action, the terminal sends, to the base station, first grouping information of beams that can be used simultaneously; and the terminal sends the measurement result information of each beam to the base station. In this action, the base station selects, from multiple beams, multiple target beams with good measurement results that can be used simultaneously according to the first grouping information and the measurement result information of each beam.

In a second implementation, before this action, the terminal sends, to the base station, second grouping information of beams that cannot be used simultaneously; and the terminal sends the measurement result information of each beam to the base station. In this action, the base station selects, from multiple beams, multiple target beams with good measurement results that can be used simultaneously according to the second grouping information and the measurement result information of each beam.

Herein, a better measurement result indicates a higher Layer1-Reference Signal Received Power (L1-RSRP), or a higher Layer1-Reference Signal Received Quality (L1-RSRQ).

(2) The base station carries the beam identifiers of the plurality of target beams in the second MAC signaling.

When a beam is applied to PDCCH reception, a beam identifier is a TCI state identifier; when the beam is used for PUCCH transmission, the beam identifier is a spatialrelationinfo state identifier. Correspondingly, the number of fields included in the second MAC signaling can be set and changed according to the number of the TCI states or the spatialrelationinfo states. For example, if there are 64 TCI states at most, the second MAC signaling needs to include 64 bits, and each bit corresponds to a TCI state in the second RRC signaling. Herein, the bit of "0" indicates that the state is not to be activated, and the bit of "1" indicates that the state is to be activated.

In S504, the base station sends the second MAC signaling to the terminal. The second MAC signaling is configured to indicate beam identifiers of the plurality of target beams that are to be activated.

In S505, the terminal receives the second MAC signaling from the base station, and acquires, from the second MAC signaling, beam identifiers of the plurality of target beams that are to be activated.

When receiving the second MAC signaling from the base station, the terminal parses the second MAC signaling, and acquires, from the second MAC signaling, beam identifiers of the plurality of target beams that are to be activated. If the terminal needs to perform data transmission with the base station within a preset duration since receiving the second MAC signaling, the terminal may acquire beam identifiers of a plurality of default target beams.

When the data transmitted between the terminal and the base station is a PDCCH, the operation that the terminal acquires the beam identifiers of the plurality of default target beams may be: the terminal acquires beam identifiers of one or more TCI states with the smallest identifiers or uses beam identifiers of the reception beams that are used in monitoring the SSB during random access.

When the data transmitted between the terminal and the base station is a PUCCH, the operation that the terminal acquires the beam identifiers of the plurality of default target beams may be: the terminal acquires the beam identifiers of one or more spatialrelationinfo states with the smallest identifiers or uses the beam identifiers of the transmitting beams that is used for Msg.3 during random access.

Exemplarily, the example in action S501 above is continued. The second MAC signaling is configured to indicate the beam identifiers of Y target beams that are to be activated. Y is less than X, and Y is a positive integer.

In S506, according to the beam identifiers of the plurality of target beams, the terminal acquires a plurality of RS identifiers corresponding to the plurality of target beams from the plurality of pieces of beam information indicated by the second RRC signaling.

The second MAC signaling carries beam identifiers of the plurality of target beams that are to be activated. Correspondingly, the terminal acquires, from the second RRC signaling according to the beam identifiers of the plurality of target beams, the beam information of the plurality of target beams that are to be activated indicated by the second MAC signaling. For each of the plurality of target beams, the terminal acquires an RS identifier corresponding to the target beam from the beam information of the target beam according to the beam identifier of the target beam.

For example, the second RRC signaling indicates 64 pieces of beam information, that is, X is 64. The second MAC signaling indicates that 8 of the 64 beams are target beams that are to be activated, that is, Y is 8. The terminal acquires RS identifiers of the 8 target beams, which are RS #0, RS #1 . . . , and RS #7 exemplarily.

In S507, the terminal acquires the plurality of target beams indicated by the plurality of RS identifiers corresponding to the plurality of target beams.

The terminal stores the correspondences between the RS identifiers and the beams; correspondingly, this action may be: the terminal acquires, according to the plurality of RS identifiers, the plurality of target beams indicated by the plurality of RS identifiers from the correspondences between the RS identifiers and the beams.

Exemplarily, the example of the operation S506 above is continued. The RS identifiers of the above 8 target beams indicate 8 beams. In this case, if the number of beams indicated by the second RRC signaling is at most 64, the number of bits used for indicating the plurality of target beams that are to be activated in the format of the second MAC signaling is 64, and each bit corresponds to a respective beam. Exemplarily, the bit of "0" indicates that the state is not to be activated, and "1" indicates that the state is to be activated. Then the bits of the 8 target beams to be activated indicated by the second MAC signaling are "1", and the bits of other beams are "0". The plurality of target beams mentioned above are a plurality of TCI states when used for downlink reception such as PDCCH reception. When used for uplink transmission such as PUCCH transmission, the plurality of target beams mentioned above are a plurality of spatialrelationinfo states. The terminal uses the above 8 beams to perform multi-beam data transmission with the base station.

In S508, the terminal uses the plurality of target beams to perform multi-beam based data transmission with the base station.

This action is the same as S408, and will not be repeated here.

In the embodiments of the disclosure, the second RRC signaling is configured to indicate a plurality of pieces of beam information, and the beam indication signaling is the second MAC signaling. The second MAC signaling is configured to indicate the beam identifiers of the plurality of target beams that are to be activated among the plurality of beams indicated by the second RRC signaling. The solution is suitable for indicating beams for PDCCH reception, or PUCCH transmission, or SSB reception, or CSI-RS reception or SRS transmission. The terminal parses out a plurality of target beams according to the second RRC signaling and the second MAC signaling, and then performs multi-beam based data transmission based on the plurality of target beams, thereby improving robustness of communication.

Figure 6:
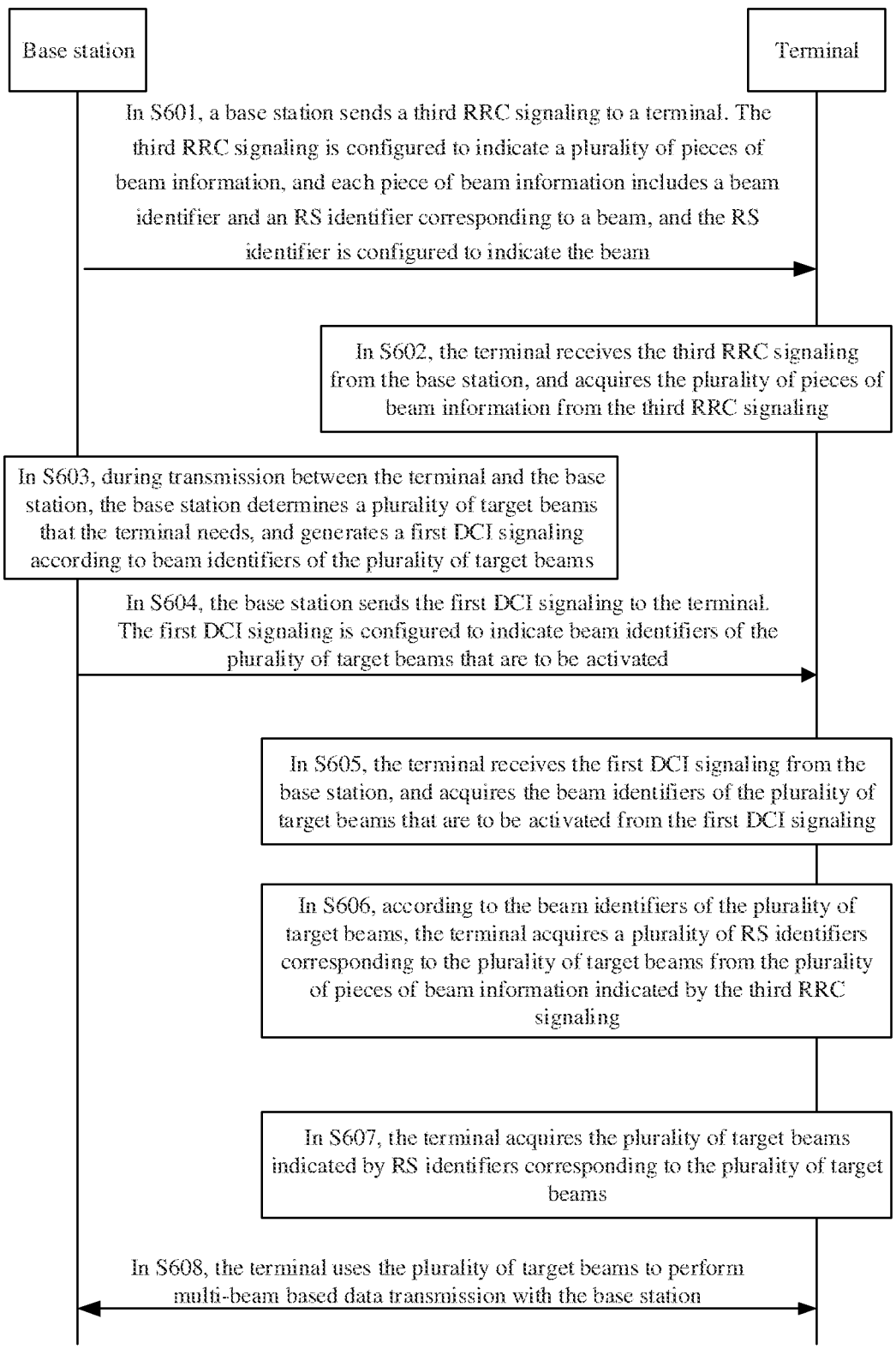
FIG. 6 illustrates a flowchart of another application of a communication method provided in the embodiments of the disclosure.

FIG. 6 illustrates a flowchart of an application of a communication method provided in the embodiments of the disclosure. In the embodiments of the disclosure, description is made with an example that the third RRC signaling indicates a plurality of pieces of beam information, the beam indication signaling is a first DCI signaling, and the first DCI signaling is configured to indicate beam identifiers of a plurality of target beams among a plurality of beams indicated by the third RRC signaling. As illustrated in FIG. 6, the procedure of the method provided in the disclosure includes the following actions S601 to S608.

In S601, a base station sends a third RRC signaling to a terminal. The third RRC signaling is configured to indicate a plurality of pieces of beam information, and each piece of beam information includes a beam identifier and an RS identifier corresponding to a beam, and the RS identifier is configured to indicate the beam.

This action is the same as the action in S501 that the base station sends the second RRC signaling to the terminal, and will not be repeated here.

In S602, the terminal receives the third RRC signaling from the base station, and acquires the plurality of pieces of beam information from the third RRC signaling.

This action is the same as the action in S502 that the terminal receives the second RRC signaling from the base station, and acquires the plurality of pieces of beam information from the second RRC signaling, and will not be repeated here.

In S603, before data transmission is performed between the terminal and the base station, the base station determines a plurality of target beams that the terminal needs, and generates a first DCI signaling according to beam identifiers of the plurality of target beams.

This action can be achieved through the following operations (1) and (2):

(1) Before data transmission is performed between the terminal and the base station, the base station determines the plurality of target beams that the terminal needs.

This operation is the same as operation (1) in S503, and will not be repeated here.

(2) The terminal carries the beam identifiers of the plurality of target beams in the first DCI signaling.

When a beam is used for receiving a PDCCH, the beam identifier is a TCI state identifier. When a beam is used for transmitting a PUCCH, the beam identifier is a spatialrelationinfo state identifier. Correspondingly, the number of fields included in the first DCI signaling can be set and changed according to the number of TCI states or the spatialrelationinfo states.

In addition, it should be noted that the DCI signaling for indicating the TCI state of the present PDSCH is format 1_1, and the DCI signaling for indicating the spatialrelationinfo state of the PUSCH is format 0_1. When the first DCI signaling is configured to indicate the beam identifiers of the plurality of target beams, the number of bits included in the first DCI signaling used for indicating the plurality of target beams is different from the number of bits used for indicating the target beams included in the current DCI signaling, and/or different meanings are indicated.

In S604, the base station sends the first DCI signaling to the terminal. The first DCI signaling is configured to indicate beam identifiers of the plurality of target beams.

In S605, the terminal receives the first DCI signaling from the base station, and acquires the beam identifiers of the plurality of target beams from the first DCI signaling.

When receiving the first DCI signaling from the base station, the terminal parses the first DCI signaling, and acquires the beam identifiers of the plurality of target beams from the first DCI signaling. If the terminal needs to perform data transmission with the base station within a preset duration after receiving the first DCI signaling, the terminal may acquire beam identifiers of a plurality of default target beams.

When the data to be transmitted between the terminal and the base station is a PDSCH, the operation that the terminal acquires the beam identifiers of the plurality of default target beams may be: the terminal acquires beam identifiers of a plurality of beams corresponding to a CORESET with the lowest CORESET number in a current slot.

When the data to be transmitted between the terminal and the base station is a PUSCH, the operation that the terminal acquires the beam identifiers of the plurality of default target beams may be: the terminal acquires beam identifiers of beams used for the most recent PUCCH.

For example, the third RRC signaling indicates X pieces of beam information, X being a positive integer, and the first DCI signaling indicates beam identifiers of Z target beams. Z is less than X, and Z is a positive integer.

In S606, according to the beam identifiers of the plurality of target beams, the terminal acquires a plurality of RS identifiers corresponding to the plurality of target beams from the plurality of pieces of beam information indicated by the third RRC signaling.

This action is similar to the action in S506 that the terminal acquires, according to the beam identifiers of the plurality of target beams, the plurality of RS identifiers corresponding to the plurality of target beams from the plurality of pieces of beam information indicated by the second RRC signaling, and will not be repeated here.

Exemplarily, the example in action S605 above is continued. The third RRC signaling indicates 64 pieces of beam information, and the first DCI signaling indicates beam identifiers of 4 target beams. RS identifiers of the 4 target beams are acquired, exemplarily, they are RS #0, RS #1, RS #2, and RS #3.

In S607, the terminal acquires the plurality of target beams indicated by RS identifiers corresponding to the plurality of target beams.

The terminal stores the correspondences between the RS identifiers and the beams; correspondingly, the action may be: the terminal acquires, according to the plurality of RS identifiers, the plurality of target beams indicated by the plurality of RS identifiers from the correspondences between the RS identifiers and the beams.

Exemplarily, the example of the operation S606 above is continued. The RS identifiers of the 4 target beams indicate 4 target beams. In this case, if the number of beams indicated in the third RRC signaling is at most 64, the number of bits used for indicating the plurality of target beams in the format of the first DCI signaling is 64, and each bit corresponds to a respective beam. Exemplarily, the bit of "0" indicates that the state is not to be activated, and "1" indicates that the state is to be activated. Then, among the bits used for indicating the target beams in the first DCI signaling, the bits corresponding to the 4 target beams to be activated are "1", and the bits corresponding to other beams are "0". When used for downlink reception such as PDSCH reception, the plurality of target beams mentioned above are a plurality of TCI states. When used for uplink transmission such as PUSCH transmission, the plurality of target beams mentioned above are a plurality of spatialrelationinfo states.

In S608, the terminal uses the plurality of target beams to perform multi-beam based data transmission with the base station.

This action is the same as action S408, and will not be repeated here.

In the embodiments of the disclosure, the third RRC signaling is configured to indicate a plurality of pieces of beam information, the beam indication signaling is the first DCI signaling, and the first DCI signaling is configured to indicate the beam identifiers of the plurality of target beams among the plurality of beams indicated by the third RRC signaling. The terminal parses out the plurality of target beams according to the third RRC signaling and the first DCI signaling, and then performs multi-beam based data transmission based on the plurality of target beams, thereby improving robustness of communication.

Figure 7:
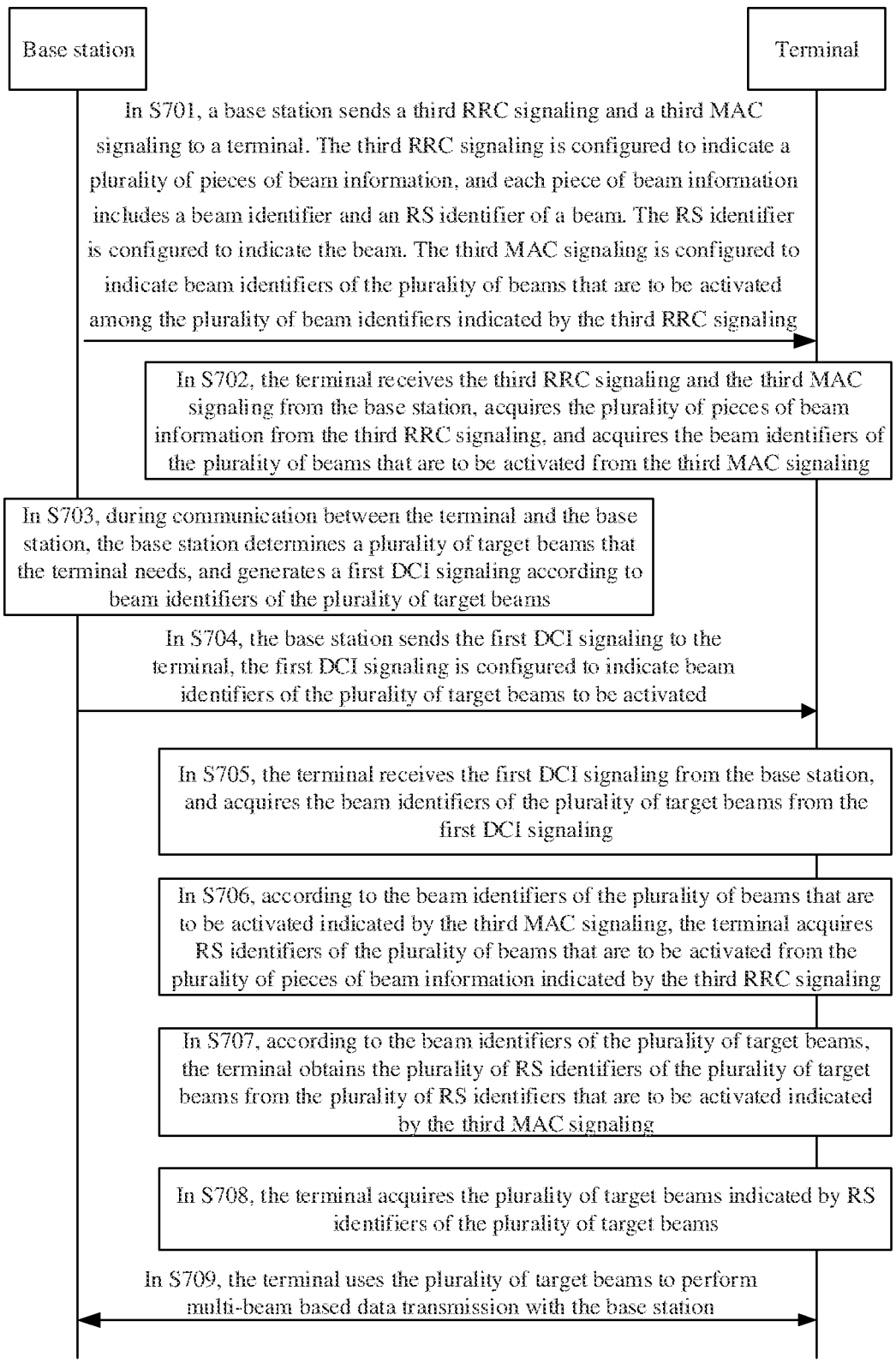
FIG. 7 illustrates a flowchart of another application of a communication method provided in the embodiments of the disclosure.

FIG. 7 illustrates a flowchart of an application of a communication method provided in the embodiments of the disclosure. In the embodiments of the disclosure, description is made with an example that a third RRC signaling indicates a plurality of pieces of beam information, a third MAC signaling indicates beam identifiers of a plurality of beams that are to be activated, a beam indication signaling is a first DCI signaling, and the first DCI signaling is configured to indicate beam identifiers of a plurality of target beams among the plurality of beams that are to be activated indicated by the third MAC signaling. As illustrated in FIG. 7, the procedure of the method provided in the disclosure includes the following actions S701 to S709.

In S701, a base station sends a third RRC signaling and a third MAC signaling to a terminal. The third RRC signaling is configured to indicate a plurality of pieces of beam information, and each piece of beam information includes a beam identifier and an RS identifier of a beam. The RS identifier is configured to indicate the beam. The third MAC signaling is configured to indicate beam identifiers of a plurality of beams that are to be activated among a plurality of beam identifiers indicated by the third RRC signaling.

Before data transmission is performed between the terminal and the base station, the base station sends the third RRC signaling to the terminal. The third RRC signaling may be sent when the terminal accesses the base station, or may be sent at any time before data transmission is performed between the terminal and the base station. In the embodiments of the disclosure, there is no specific limitation on the timing for the base station to send the third RRC signaling to the terminal.

Based on the report result of each beam reported by the terminal, and/or the beam group information that can be received simultaneously or the beam group information that cannot be received simultaneously reported by the terminal, the base station may select, from multiple beams, a plurality of beams that are to be activated.

After the base station selects the plurality of beams that are to be activated, beam identifiers of the plurality of beams are carried in the third MAC signaling. Herein, multiple beams are used in the third MAC signaling to indicate the beam identifiers of the plurality of beams that are to be activated, and each bit corresponds to a beam (TCI state or spatialrelationinfo state) in the third RRC signaling. A bit of "0" indicates that a respective beam is not to be activated, and a bit of "1" indicates that the beam is to be activated.

For example, X pieces of beam information are indicated in the third RRC signaling, and X is a positive integer. The third MAC signaling indicates beam identifiers of Y beams that are to be activated. Y is less than X, and Y is a positive integer.

In S702, the terminal receives the third RRC signaling and the third MAC signaling from the base station, acquires the plurality of pieces of beam information from the third RRC signaling, and acquires the beam identifiers of the plurality of beams that are to be activated from the third MAC signaling.

The terminal receives the third RRC signaling and the third MAC signaling from the base station, parses the third RRC signaling and the third MAC signaling, acquires the plurality of pieces of beam information from the third RRC signaling, and acquires the beam identifiers of the plurality of beams that are to be activated from the third MAC signaling. For example, the third RRC signaling indicates the identifiers RS #0 to RS #63 of 64 beams, and the third MAC signaling indicates that the 8 beams that are to be activated are RS #0 to RS #7.

In S703, before data transmission is performed between the terminal and the base station, the base station determines a plurality of target beams that the terminal needs, and generates a first DCI signaling according to beam identifiers of the plurality of target beams.

This action is the same as action S603, and will not be repeated here.

In S704, the base station sends the first DCI signaling to the terminal, the first DCI signaling is configured to indicate the beam identifiers of the plurality of target beams.

In S705, the terminal receives the first DCI signaling from the base station, and acquires the beam identifiers of the plurality of target beams from the first DCI signaling.

This action is the same as action S605, and will not be repeated here.

Exemplarily, the example in action S702 above is continued. The first DCI signaling indicates beam identifiers of Z target beams, where Z is less than Y, and Z is a positive integer. For example, the first DCI indicates 4 target beams.

It should be noted here that the first DCI signaling indicates a plurality of target beams among the plurality of beams that are to be activated indicated by the third MAC signaling. For example, the third RRC signaling indicates the identifiers RS #0 to RS #63 of 64 beams, and the third MAC signaling indicates that the 8 beams that are to be activated are RS #0 to RS #7. The target beams indicated by the first DCI signaling are the first 4 beams, and the target beams are beams RS #0 to RS #3.

For another example, the third RRC signaling indicates the identifiers RS #0 to RS #63 of 64 beams, and the third MAC signaling indicates that the 8 beams that are to be activated are RS #0, RS #3, RS #4, RS #5, RS #9, RS #15, RS #21, and RS #24. In this case, if the target beams indicated by the first DCI signaling are the first 4 beams, the target beams are beams RS #0, RS #3, RS #4, and RS #5. That is, what the first DCI signaling indicates here are not the beam identifiers given in the RRC signaling, but new serial numbers given to the beam identifiers of the 8 beams to be activated in the third MAC signaling after sorting the serial numbers of the beam identifiers of the 8 beams from small to large. That is, if the DCI signaling indicates the beam with a serial number 0, it corresponds to RS #0; if the DCI signaling indicates the beam with a serial number 1, it corresponds to RS #3; if the DCI signaling indicates the beam with a serial number 2, it corresponds to RS #4; if the DCI signaling indicates the beam with a serial number 3, it corresponds to RS #5, and so on.

In S706, according to the beam identifiers of the plurality of beams that are to be activated indicated by the third MAC signaling, the terminal acquires RS identifiers of the plurality of beams that are to be activated from the plurality of pieces of beam information indicated by the third RRC signaling.

Exemplarily, the example in action S705 above is continued. The third RRC signaling indicates 64 pieces of beam information, the third MAC signaling indicates the beam identifiers of 8 beams that are to be activated, and the terminal acquires the RS identifiers of the 8 beams that are to be activated, i.e., RS #0, RS #1 . . . , RS #7.

In S707, according to the beam identifiers of the plurality of target beams, the terminal acquires a plurality of RS identifiers of the plurality of target beams indicated by the first DCI signaling from the plurality of RS identifiers of the beams that are to be activated indicated by the third MAC signaling.

This action is similar to action S606, and will not be repeated here.

Exemplarily, the example in action S705 above is continued. The first DCI signaling indicates the beam identifiers of 4 target beams, and the RS identifiers of the 4 target beams are acquired, which are RS #0, RS #1, RS #2, and RS #3, exemplarily.

In S708, the terminal acquires the plurality of target beams indicated by RS identifiers of the plurality of target beams.

The terminal stores the correspondences between the RS identifiers and the beams; correspondingly, this action may be: the terminal acquires, according to the plurality of RS identifiers, the plurality of target beams indicated by the plurality of RS identifiers from the correspondences between the RS identifiers and the beams.

Exemplarily, the example of operation S706 above is continued. Herein, the RS identifiers of the 4 target beams indicate 4 beams. In this case, since the maximum number of beams that are to be activated indicated by the third MAC signaling is 8, the number of bits used for indicating the plurality of target beams in the format of the first DCI signaling is 8, and each bit corresponds to a beam. Exemplarily, a bit of "0" indicates that a respective state is not to be activated, and "1" indicates that the respective state is to be activated. Then, among the bits used for indicating the target beams in the first DCI signaling, the bits corresponding to the 4 target beams to be activated are "1", and the bits corresponding to the other beams are "0". When used for PDCCHs, the plurality of target beams mentioned above are a plurality of TCI states. When used for PUCCHs, the plurality of target beams mentioned above are a plurality of spatialrelationinfo states. The terminal uses the above 4 beams to perform multi-beam data transmission with the base station.

In S709, the terminal uses the plurality of target beams to perform multi-beam based data transmission with the base station.

This action is the same as action S408, and will not be repeated here.

In the embodiments of the disclosure, the third RRC signaling is configured to indicate a plurality of pieces of beam information, and the third MAC signaling indicates the beam identifiers of the plurality of beams that are to be activated. The beam indication signaling is the first DCI signaling, and the first DCI signaling is configured to indicate the beam identifiers of the plurality of target beams among the plurality of beams that are to be activated indicated by the third MAC signaling. The terminal parses out the plurality of target beams according to the third RRC signaling, the third MAC signaling and the first DCI signaling, and then performs multi-beam based data transmission based on the plurality of target beams, thereby improving robustness of communication.

Figure 8:
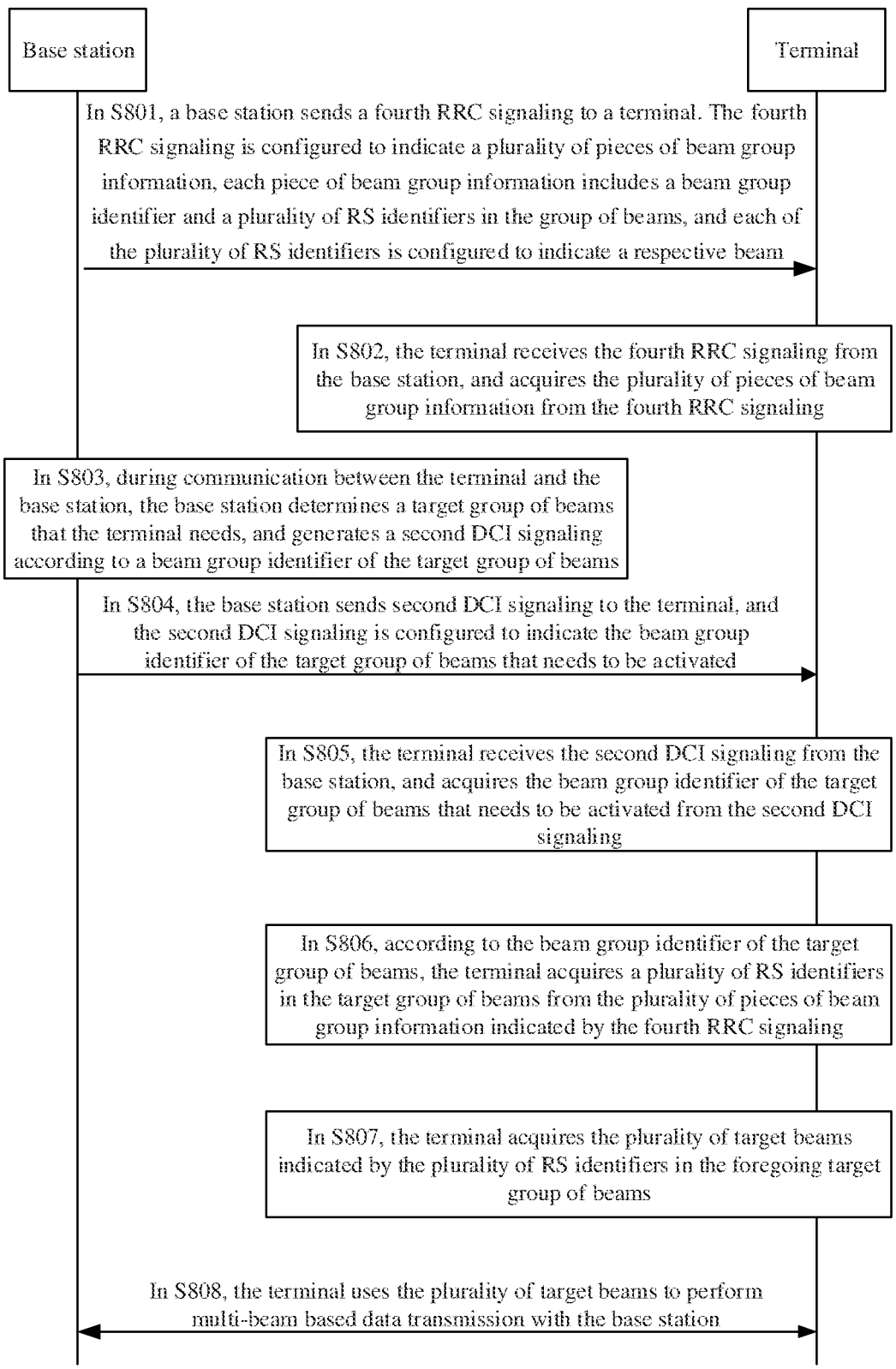
FIG. 8 illustrates a flowchart of another application of a communication method provided in the embodiments of the disclosure.

FIG. 8 illustrates a flowchart of an application of a communication method provided in the embodiments of the disclosure. In the embodiments of the disclosure, description is made with an example that a fourth RRC signaling is configured to indicate a plurality of pieces of beam group information, the beam indication signaling is a second DCI signaling, and the second DCI signaling is configured to indicate a beam group identifier of a target group of beams among a plurality groups of beams indicated by the fourth RRC signaling. As illustrated FIG. 8, the procedure of the method provided in the disclosure includes the following actions S801 to S808.

In S801, a base station sends a fourth RRC signaling to a terminal. The fourth RRC signaling is configured to indicate a plurality of pieces of beam group information, each piece of beam group information includes a beam group identifier and a plurality of RS identifiers in a group of beams, and each of the plurality of RS identifiers is configured to indicate a respective beam.

This action is the same as the action in S401 that the base station sends the first RRC signaling to the terminal, and will not be repeated here.

In S802, the terminal receives the fourth RRC signaling from the base station, and acquires the plurality of pieces of beam group information from the fourth RRC signaling.

This action is similar to the action in S402 that the terminal receives the first RRC signaling from the base station and acquires the plurality of pieces of beam group information from the first RRC signaling, and will not be repeated here.

In S803, during communication between the terminal and the base station, the base station determines a target group of beams that the terminal needs, and generates a second DCI signaling according to a beam group identifier of the target group of beams.

This action can be achieved through the following operations (1) and (2):

(1) During communication between the terminal and the base station, the base station determines a target group of beams that the terminal needs.

This operation is the same as operation (1) in S403, and will not be repeated here.

(2) The base station carries a beam group identifier of the target group of beams in the second DCI signaling.

The second DCI signaling includes multiple bits for indicating the target group of beams, and the base station uses the multiple bits to identify the beam group identifier of the target group of beams. For example, the fourth RRC signaling indicates 64 beam groups at most, the number of bits used for indicating the target group of beams in the second DCI signaling is 6. The 6 bits can indicate 64 beam group identifiers. When the beam group identifier of the target group of beams is beam group #0, the base station may set all the 6 bits used for indicating the target group of beams in the second DCI signaling to 0, i.e., 000000, thereby identifying beam group #0. For another example, when the beam group identifier of the target group of beams is beam group #1, the base station can set the first 5 bits of the 6 bits used for indicating the target group of beams in the second DCI signaling to 0, and set the sixth bit to 1, i.e., 000001, thus identifying beam group #1, and so on.

In S804, the base station sends a second DCI signaling to the terminal, and the second DCI signaling is configured to indicate the beam group identifier of the target group of beams.

In S805, the terminal receives the second DCI signaling from the base station, and acquires the beam group identifier of the target group of beams from the second DCI signaling.

When receiving the second DCI signaling from the base station, the terminal parses the second DCI signaling, and acquires the beam group identifier of the target group of beams from the second DCI signaling. If the terminal needs to perform data transmission with the base station within a preset duration after receiving the second DCI signaling, the terminal may acquire the beam group identifier of a default target group of beams.

When the data transmitted between the terminal and the base station is a PDSCH, the operation that the terminal acquires the beam group identifier of the default target group of beams may be: the terminal acquires the beam group identifier of the beam group corresponding the CORESET with the lowest CORESET number in the current slot.

When the data transmitted between the terminal and the base station is a PUSCH, the operation that the terminal acquires the beam group identifier of the default target group of beams may be: the terminal acquires the beam group identifier of the beam group used for the most recent PUCCH.

Exemplarily, the example in the operation S402 above is continued. For example, if the base station determines that the terminal is to use the first beam group, the beam group identifier of the target group of beams indicated by the second DCI signaling is beam group #0.

In S806, according to the beam group identifier of the target group of beams, the terminal acquires a plurality of RS identifiers in the target group of beams from the plurality of pieces of beam group information indicated by the fourth RRC signaling.

The second DCI signaling carries the beam group identifier of the target group of beams, and the terminal determines, through the beam group identifier, the target group of beams corresponding to the beam group identifier among a plurality groups of beams indicated by the fourth RRC signaling, and acquires a plurality of RS identifiers in the target group of beams. Herein, if the target group of beams is applied to downlink reception such as PDSCH reception, the target group of beams is a TCI state group. If the target group of beams is used for uplink transmission such as PUSCH transmission, the target group of beams is a spatialrelationinfo state group.

Exemplarily, the fourth RRC signaling indicates the beam group information of 64 beam groups. The second DCI signaling indicates the target group of beams #0 through the beam group identifier of the target group of beams, and the UE acquires a plurality of RS identifiers in the group of beams by parsing the fourth RRC signaling and the second DCI signaling.

In S807, the terminal acquires the plurality of target beams indicated by the plurality of RS identifiers in the foregoing target group of beams.

The terminal stores the correspondences between the RS identifiers and the beams; correspondingly, the action may be: the terminal acquires, according to the plurality of RS identifiers, the plurality of target beams indicated by the plurality of RS identifiers from the correspondences between the RS identifiers and the beams.

Exemplarily, the example in action S806 is continued. The beam RS identifiers in beam group #0 determined by the second DCI signaling are RS #0 and RS #1 respectively, and the corresponding beams are determined according to the RS identifiers. When the beam group is applied to PDSCHs, it is a TCI state group. When the beam group is applied to PUSCHs, it is a spatialrelationinfo state group.

In S808, the terminal uses the plurality of target beams to perform multi-beam based data transmission with the base station.

This action is the same as action S408, and will not be repeated here.

In the embodiments of the disclosure, the fourth RRC signaling is configured to indicate a plurality of pieces of beam group information, the beam indication signaling is the second DCI signaling, and the second DCI signaling is configured to indicate the beam group identifier of the target group of beams among the plurality groups of beams indicated by the fourth RRC signaling. The terminal parses out the plurality of target beams according to the fourth RRC signaling and the second DCI signaling, and then performs multi-beam based data transmission based on the plurality of target beams, thereby improving robustness of communication.

Figure 9:
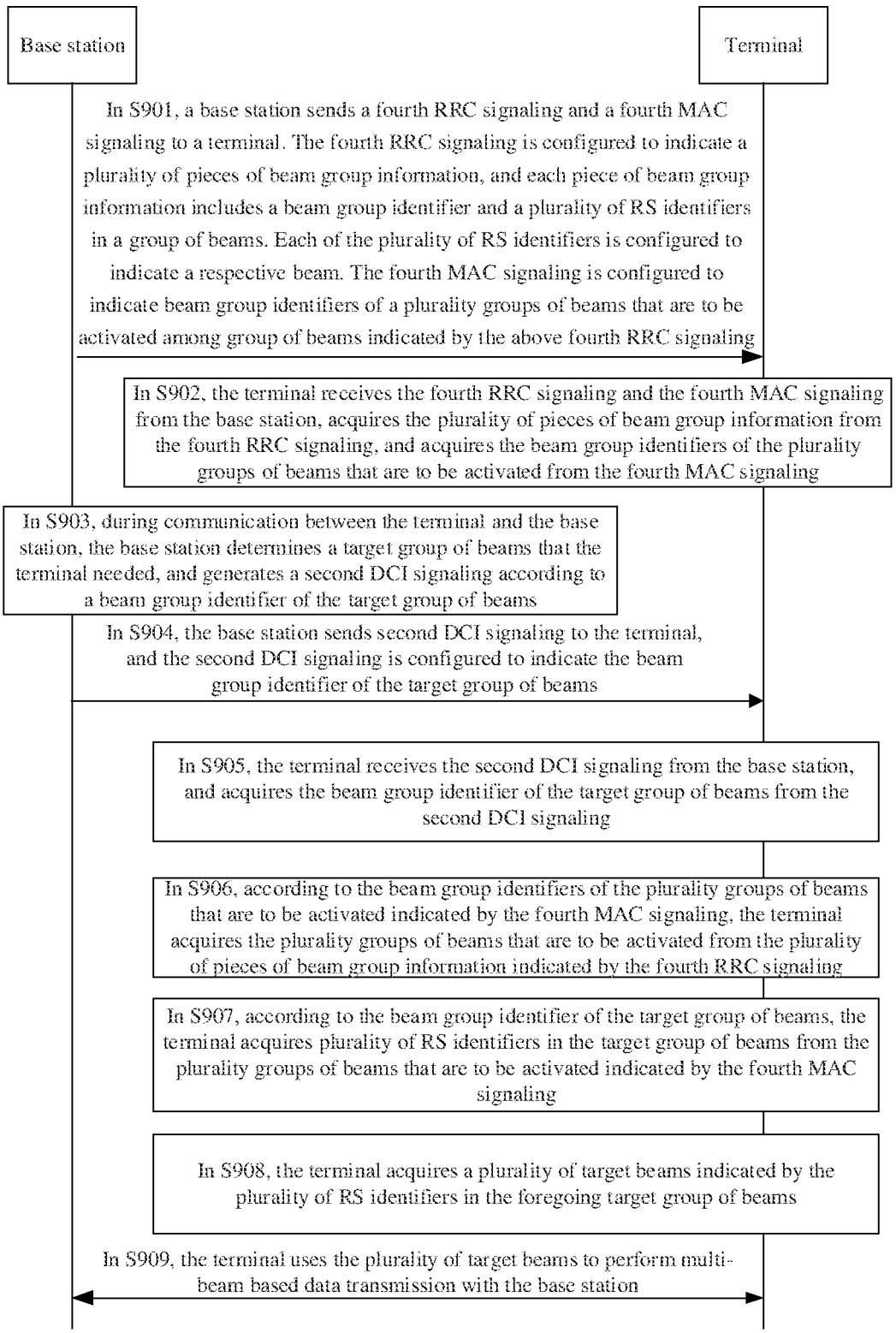
FIG. 9 illustrates a flowchart of another application of a communication method provided in the embodiments of the disclosure.

FIG. 9 illustrates a flowchart of an application of a communication method provided in the embodiments of the disclosure. In the embodiments of the disclosure, description is made with an example that a fourth RRC signaling is configured to indicate a plurality of pieces of beam group information, and a fourth MAC signaling is configured to indicate beam group identifiers of a plurality groups of beams that are to be activated among a plurality groups of beams indicated by the fourth RRC signaling, the beam indication signaling is a second DCI signaling, and the second DCI signaling is configured to indicate a beam group identifier of a target group of beams among the plurality groups of beams that are to be activated indicated by the fourth MAC signaling. As illustrated in FIG. 9, the procedure of the method provided in the disclosure includes the following actions S901 to S909.

In S901, a base station sends a fourth RRC signaling and a fourth MAC signaling to a terminal. The fourth RRC signaling is configured to indicate a plurality of pieces of beam group information, and each piece of beam group information includes a beam group identifier and a plurality of RS identifiers in a group of beams. Each of the plurality of RS identifiers is configured to indicate a respective beam. The fourth MAC signaling is configured to indicate beam group identifiers of a plurality groups of beams that are to be activated among groups of beams indicated by the above fourth RRC signaling.

The process that the base station determines the fourth RRC signaling in this action is the same as the action in S401, and will not be repeated.

Based on the report result of each beam group reported by the terminal, and/or the beam group information that can be received simultaneously or the beam grouping information of beam groups that cannot be received simultaneously reported by the terminal, the base station may select, from a plurality of beam groups, a plurality beam groups that are to be activated.

After the base station selects the plurality beam groups that are to be activated, beam group identifiers of the plurality groups of beams are carried in the fourth MAC signaling. Herein, a plurality of bits are used in the fourth MAC signaling to indicate the beam group identifiers of the plurality groups of beams that are to be activated, and each bit corresponds to a respective beam group (TCI state group or RSI state group) in the fourth RRC signaling. A bit of "0" indicates that a respective beam group is not to be activated, and the bit of "1" indicates that the respective beam group is to be activated.

In S902, the terminal receives the fourth RRC signaling and the fourth MAC signaling from the base station, acquires the plurality of pieces of beam group information from the fourth RRC signaling, and acquires the beam group identifiers of the plurality groups of beams that are to be activated from the fourth MAC signaling.

When receiving the fourth RRC signaling and the fourth MAC signaling from the base station, the terminal parses the first RRC signaling and the fourth MAC signaling, acquires the plurality of pieces of beam group information from the fourth RRC signaling, and acquires the beam group identifiers of the plurality groups of beams that are to be activated from the fourth MAC signaling. Exemplarily, the fourth RRC signaling indicates M pieces of beam group information, M is a positive integer, and the identifiers of the M beam groups are beam group #0, beam group #1, beam group #2 . . . beam Group #(M−1). The fourth MAC signaling indicates the beam group identifiers of N beam groups that are to be activated, where N is less than M, and N is a positive integer. Taking M as 64 as an example, the 64 beam groups are identified as #0, #1, #2 . . . #63; and taking the beam group numbered #0 as an example, the beam directions in the group of beams are respectively RS #0 and RS #1. RS #0 is a RS identifier. That is, the beam group includes two beams. The number of beams in the group of beams is at least two, which is not specifically limited in the embodiments.

In S903, during communication between the terminal and the base station, the base station determines a target group of beams that the terminal needed, and generates a second DCI signaling according to a beam group identifier of the target group of beams.

This action can be achieved through the following operations (1) and (2):

(1) during communication between the terminal and the base station, the base station determines a target group of beams that the terminal needs.

When the terminal needs to transmit data to the base station or the base station needs to send data to the terminal, the base station determines a plurality groups of beams that the terminal needs to activate from a plurality groups of beams indicated by the fourth RRC signaling sent to the terminal, and determines the target group of beams that the terminal needs from the plurality groups of beams that are to be activated indicated by the fourth MAC signaling. Herein, according to the measurement result for each beam sent by the terminal, the base station may select a plurality groups of beams with better measurement results from the plurality groups of beams indicated by the fourth RRC signaling as the plurality groups of beams that are to be activated by the fourth MAC signaling, and then select the target group of beams with best measurement result from the plurality groups of beams that are to be activated. Herein, the data that the terminal needs to send to the base station may be a PUCCH, or a PUSCH, or an SRS; the data that the base station needs to send to the terminal may be a PDCCH, or a PDSCH, or an SSB, or a CSI-RS.

Herein, a better measurement result indicates a higher Layer1-Reference Signal Received Power (L1-RSRP), or a higher Layer1-Reference Signal Received Quality (L1-RSRQ).

(2) The base station carries the beam group identifier of the target group of beams in the second DCI signaling.

The second DCI signaling includes a plurality of bits for indicating the target beam group, and the base station uses the plurality of bits to identify the beam group identifier of the target beam group. For example, when the maximum number of beam groups to be activated indicated by the fourth MAC signaling is 8, the number of bits used for indicating the target beam group in the second DCI signaling is 3, and the 3 bits exactly indicate 8 beam group identifiers. For example, when the beam group to be activated indicated by the fourth MAC signaling are beam groups #0, #3, #4, #5, #9, #15, #21, #24, the 3 bits used for indicating the target beam group in the DCI signaling successively indicate the 8 beam groups to be activated. For example, when the 3 bits are 000, it indicates that the target beam group is beam group #0; when the 3 bits are 001, it indicates that the target beam group is beam group #3; when the 3 bits are 010, it indicates that the target beam group is beam group #4; when the 3 bits are 011, it indicates the target beam group is beam group #5; when the 3 bits are 100, it indicates that the target beam group is beam group #9, and so on.

In S904, the base station sends a second DCI signaling to the terminal, and the second DCI signaling is configured to indicate the beam group identifier of the target group of beams.

In S905, the terminal receives the second DCI signaling from the base station, and acquires the beam group identifier of the target group of beams from the second DCI signaling.

When receiving the second DCI signaling from the base station, the terminal parses the second DCI signaling, and acquires the beam group identifier of the target beam group from the second DCI signaling. If the terminal needs to perform data transmission with the base station within a preset duration after receiving the second DCI signaling, the terminal may acquire a beam group identifier of a default target beam group.

When the data transmitted between the terminal and the base station is a PDSCH, the operation that the terminal acquires the beam group identifier of the default target beam group may be: the terminal acquires the beam group identifier of the beam group corresponding to the CORESET with the lowest CORESET number in the current slot.

When the data transmitted between the terminal and the base station is a PUSCH, the operation that the terminal acquires the beam group identifier of the default target beam group may be: the terminal acquires the beam group identifier of the beam group used for the most recent PUCCH.

In addition, it should be noted that the DCI signaling indicating the TCI state of the current PDSCH is in format 1_1, and the DCI signaling indicating the spatialrelationinfo state of the PUSCH is in format 0_1. When the second DCI signaling is configured to indicate the beam group identifier of the target beam group, the number of bits used for indicating the target beam group included in the second DCI signaling is different from the number of bits used for indicating the target beams included in the current DCI signaling, and/or different meanings are indicated.

Exemplarily, the example in the operation S902 above is continued. For example, if the base station determines to use the first beam group, the second DCI signaling indicates that the beam group identifier of the target beam group is beam group #0.

In S906, according to the beam group identifiers of the plurality groups of beams that are to be activated indicated by the fourth MAC signaling, the terminal acquires the plurality groups of beams that are to be activated from the plurality of pieces of beam group information indicated by the fourth RRC signaling.

Exemplarily, the example in action S902 is continued. The fourth MAC signaling indicates the beam group identifiers of the 8 beam groups that are to be activated. Exemplarily, the identifiers of the above 8 beam groups are #0, #1, #2 . . . #7.

In S907, according to the beam group identifier of the target group of beams, the terminal acquires plurality of RS identifiers in the target group of beams from the plurality groups of beams that are to be activated indicated by the fourth MAC signaling.

Exemplarily, the example in action S905 above is continued. According to the beam group identifier #0 of the target group of beams, RS #0 and RS #1 in the group of beams are acquired.

In S908, the terminal acquires a plurality of target beams indicated by the plurality of RS identifiers in the foregoing target group of beams.

The terminal stores the correspondences between the RS identifiers and the beams; correspondingly, the action may be: the terminal acquires, according to the plurality of RS identifiers, the plurality of target beams indicated by the plurality of RS identifiers from the correspondences between the RS identifiers and the beams.

Exemplarily, the example in action S907 is continued. The beam RS identifiers in beam group #0 determined by the second DCI signaling are RS #0 and RS #1 respectively, and the corresponding beams are determined according to the RS identifiers. When this beam group is applied to PDCCHs, it is a TCI state group. When the beam group is applied to PUCCHs, it is a spatialrelationinfo state group.

In S909, the terminal uses the plurality of target beams to perform multi-beam based data transmission with the base station.

This action is the same as action S808, and will not be repeated here.

In the embodiments of the disclosure, the fourth RRC signaling is configured to indicate a plurality of pieces of beam group information, and the fourth MAC signaling is configured to indicate beam group identifiers of a plurality groups of beams that are to be activated among the groups of beams indicated by the fourth RRC signaling. The beam indication signaling is the second DCI signaling, and the second DCI signaling is configured to indicate the beam group identifier of the target group of beams among the plurality groups of beams that are to be activated indicated by the fourth MAC signaling. The terminal parses out the plurality of target beams according to the fourth RRC signaling, the fourth MAC signaling and the second DCI signaling, and then performs multi-beam based data transmission based on the plurality of target beams, thereby improving robustness of communication.

Figure 10:
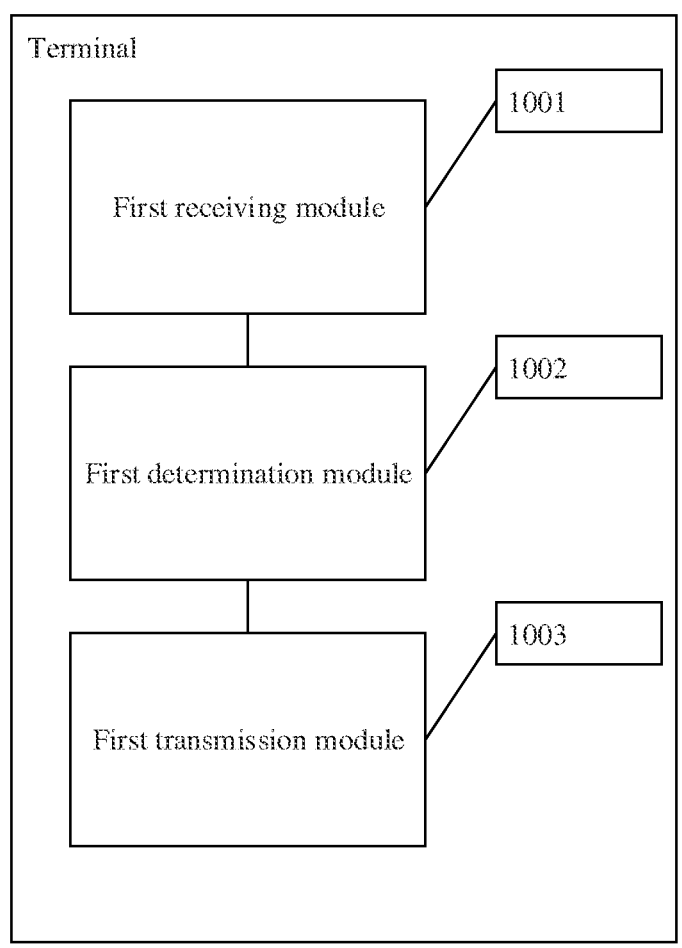
FIG. 10 illustrates a block diagram of a communication apparatus provided in the embodiments of the disclosure.

FIG. 10 illustrates a block diagram of a communication apparatus provided in the embodiments of the disclosure. The apparatus is applied to a terminal and is configured to execute the operations executed by the terminal in the above-mentioned communication method. Referring to FIG. 10, the apparatus includes: a first receiving module 1001, a first determination module 1002 and a first transmission module 1003.

The first receiving module 1001 is configured to receive a beam indication signaling from a base station. The beam indication signaling is configured to indicate a plurality of target beams or a target group of beams.

The first determination module 1002 is configured to determine, according to the beam indication signaling, the plurality of target beams or the target group of beams.

The first transmission module 1003 is configured to perform multi-beam based data transmission with the base station based on the plurality of target beams or the target group of beams.

In a possible implementation, the beam indication signaling received by the first receiving module 1001 is a first MAC signaling, and the first MAC signaling is configured to indicate a beam group identifier of the target group of beams that are to be activated.

In another possible implementation, the apparatus further includes a second receiving module. The second receiving module is configured to receive a first RRC signaling from the base station. The first RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams.

The first determination module 1002 is configured to acquire, according to the beam group identifier of the target group of beams, a plurality of RS identifiers in the target group of beams from the plurality of pieces of beam group information indicated by the first RRC signaling; the first determination module 1002 is further configured to acquire a plurality of target beams indicated by the plurality of RS identifiers in the target group of beams.

In another possible implementation, the beam indication signaling received by the first receiving module 1001 is a second MAC signaling, and the second MAC signaling is configured to indicate beam identifiers of a plurality of target beams that are to be activated.

In another possible implementation, the apparatus further includes a third receiving module. The third receiving module is configured to receive a second RRC signaling from the base station. The second RRC signaling is configured to indicate a plurality of pieces of beam information, each piece of beam information includes a beam identifier and an RS identifier corresponding to a beam, and the RS identifier is configured to indicate the beam.

The first determination module 1002 is configured to acquire, according to the beam identifiers of the plurality of target beams, a plurality of RS identifiers corresponding to the plurality of target beams from the plurality of pieces of beam information indicated by the second RRC signaling; and the first determination module 1002 is further configured to acquire the plurality of target beams indicated by the plurality of RS identifiers corresponding to the plurality of target beams.

In another possible implementation, the beam indication signaling received by the first receiving module 1001 is first DCI signaling, and the first DCI signaling is configured to indicate beam identifiers of a plurality of target beams.

In another possible implementation, the apparatus further includes a fourth receiving module. The fourth receiving module is configured to receive a third RRC signaling from the base station, where the third RRC signaling is configured to indicate a plurality of pieces of beam information, each piece of beam information includes a beam identifier and an RS identifier corresponding to a beam, and the RS identifier is configured to indicate the beam.

The first determination module 1002 is configured to acquire, according to the beam identifiers of the plurality of target beams, a plurality of RS identifiers corresponding to the plurality of target beams from the plurality of pieces of beam information indicated by the third RRC signaling; and the first determination module 1002 is further configured to acquire the plurality of target beams indicated by the plurality of RS identifiers corresponding to the plurality of target beams.

In another possible implementation, the apparatus further includes a fifth receiving module. The fifth receiving module is configured to receive a third RRC signaling and a third MAC signaling from the base station. The third RRC signaling is configured to indicate a plurality of pieces of beam information, and each piece of beam information includes a beam identifier and an RS identifier corresponding to a beam. The RS identifier is configured to indicate the beam, and the third MAC signaling is configured to indicate beam identifiers of a plurality of beams that are to be activated among a plurality of beam identifiers indicated by the third RRC signaling.

The first determination module 1002 is configured to acquire, according to the beam identifiers of the plurality of beams that are to be activated indicated by the third MAC signaling, RS identifiers of the plurality of beams that are to be activated from the plurality of pieces of beam information indicated by the third RRC signaling; the first determination module 1002 is further configured to acquire, according to the beam identifiers of the plurality of target beams, a plurality of RS identifiers corresponding to the plurality of target beams from the RS identifiers of the plurality of beams that are to be activated indicated by the third MAC signaling; and the first determination module 1002 is further configured to acquire the plurality of target beams indicated by the plurality of RS identifiers corresponding to the plurality of target beams.

In another possible implementation, the beam indication signaling received by the first receiving module 1001 is a second DCI signaling, and the second DCI signaling is configured to indicate a beam group identifier of the target group of beams.

In another possible implementation, the apparatus further includes a sixth receiving module. The sixth receiving module is configured to receive a fourth RRC signaling from the base station. The fourth RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams.

The first determination module 1002 is configured to acquire, according to the beam group identifier of the target group of beams, a plurality of RS identifiers in the target group of beams from the plurality of pieces of beam group information indicated by the fourth RRC signaling; and the first determination module 1002 is further configured to acquire a plurality of target beams indicated by the plurality of RS identifiers in the target group of beams.

In another possible implementation, the apparatus further includes a seventh receiving module. The seventh receiving module is configured to receive a fourth RRC signaling and a fourth MAC signaling from the base station. The fourth RRC signaling is configured to indicate a plurality of pieces of beam group information, and each piece of beam group information includes a beam group identifier and a plurality of RS identifiers in the group of beams. Each of the plurality of RS identifiers is configured to indicate a respective beam in the group of beams. The fourth MAC signaling is configured to indicate beam group identifiers of a plurality groups of beams that are to be activated among the groups of beams indicated by the fourth RRC signaling.

The first determination module 1002 is configured to acquire, according to the beam group identifiers of the plurality groups of beams that are to be activated indicated by the fourth MAC signaling, the plurality groups of beams that are to be activated from the plurality of pieces of beam group information indicated by the fourth RRC signaling; the first determination module 1002 is further configured to acquire, according to the beam group identifier of the target group of beams, a plurality of RS identifiers in the target group of beams from the plurality groups of beams that are to be activated indicated by the fourth MAC signaling; and the first determination module 1002 is further configured to acquire a plurality of target beams indicated by the plurality of RS identifiers in the target group of beams.

In another possible implementation, the apparatus further includes a second transmission module. The second transmission module is configured to perform data transmission with the base station. The first determination module is configured to: when the data transmission is performed within a preset duration since the beam indication signaling is received, acquire a default target group of beams or one or more default target beams.

In another possible implementation, the first determination module is performed to: when the data transmission is performed after a preset duration since the beam indication signaling, determine, according to the beam indication signaling, the plurality of target beams or the target group of beams.

The terminal determines the plurality of target beams or the target group of beams according to the beam indication signaling, and performs multi-beam based data transmission with the base station based on the plurality of target beams. Since a plurality of target beams are determined by the terminal based on the beam indication signaling, multi-beam based data transmission can be performed between the terminal and the base station, thereby improving robustness of communication.

Figure 11:
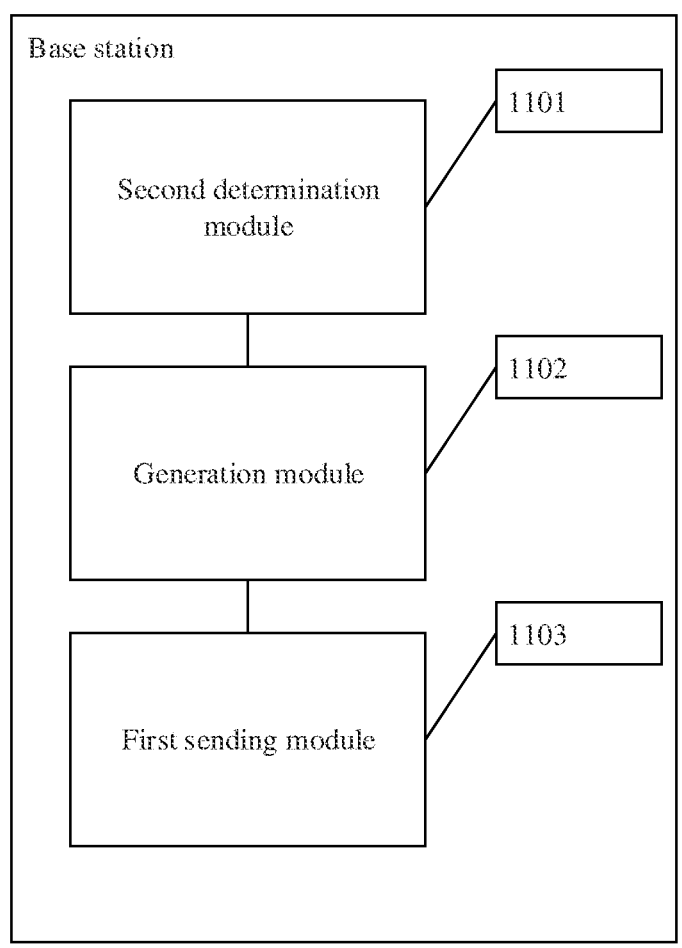
FIG. 11 illustrates a block diagram of another communication apparatus provided in the embodiments of the disclosure.

FIG. 11 illustrates a block diagram of a communication apparatus provided in the embodiments of the disclosure. The apparatus is applied to a base station and is configured to execute the operations executed by the base station in the above-mentioned communication method. Referring to FIG. 11, the apparatus includes: a second determination module 1101, a generation module 1102 and a first sending module 1103.

The second determination module 1101 is configured to determine a plurality of target beams or a target group of beams for multi-beam transmission with a terminal. The generation module 1102 is configured to generate a beam indication signaling according to the plurality of target beams or the target group of beams. The beam indication signaling is configured to indicate the plurality of target beams or the target group of beams. The first sending module 1103 is configured to send the beam indication signaling to the terminal. The beam indication signaling is used for the terminal to determine the plurality of target beams or the target group of beams, and to perform multi-beam based data transmission with the base station based on the plurality of target beams or the target group of beams.

In a possible implementation, the beam indication signaling sent by the first sending module 1103 is a first MAC signaling, and the first MAC signaling is configured to indicate a beam group identifier of the target group of beams that are to be activated.

In another possible implementation, the apparatus further includes a second sending module.

The second sending module is configured to send a first RRC signaling to the terminal. The first RRC signaling is configured to indicate a plurality of pieces of beam group information, each piece of beam group information includes a beam group identifier and a plurality of RS identifiers in the group of beams, and each of the plurality of RS identifiers is configured to indicate a respective beam in the group of beams.

In another possible implementation, the beam indication signaling sent by the first sending module 1103 is a second MAC signaling, and the second MAC signaling is configured to indicate beam identifiers of a plurality of target beams that are to be activated.

In another possible implementation, the apparatus further includes a third sending module.

The third sending module is configured to send a second RRC signaling to the terminal. The second RRC signaling is configured to indicate a plurality of pieces of beam information, each piece of beam information includes a beam identifier and an RS identifier corresponding to a beam, and the RS identifier is configured to indicate the beam.

In another possible implementation, the beam indication signaling sent by the first sending module 1103 is a first DCI signaling, and the first DCI signaling is configured to indicate beam identifiers of the plurality of target beams.

In another possible implementation, the apparatus further includes a fourth sending module.

The fourth sending module is configured to send a third RRC signaling to the terminal. The third RRC signaling is configured to indicate a plurality of pieces of beam information, each piece of beam information includes a beam identifier and an RS identifier corresponding to a beam, and the RS identifier is configured to indicate the beam.

In another possible implementation, the apparatus further includes a fifth sending module.

The fifth sending module is configured to send a third RRC signaling and a third MAC signaling to the terminal. The third RRC signaling is configured to indicate a plurality of pieces of beam information, and each piece of beam information includes a beam identifier and an RS identifier corresponding to a beam. The RS identifier is configured to indicate the beam. The third MAC signaling is configured to indicate beam identifiers of a plurality of beams that are to be activated among a plurality of beam identifiers indicated by the third RRC signaling.

In another possible implementation, the beam indication signaling sent by the first sending module 1103 is a second DCI signaling, and the second DCI signaling is configured to indicate a beam group identifier of the target group of beams.

In another possible implementation, the apparatus further includes a sixth sending module.

The sixth sending module is configured to send a fourth RRC signaling to the terminal. The fourth RRC signaling is configured to indicate a plurality of pieces of beam group information, and each piece of beam group information includes a beam group identifier and a plurality of RS identifiers in the group of beams. Each of the plurality of RS identifiers is configured to indicate a respective beam in the group of beams.

In another possible implementation, the apparatus further includes a seventh sending module.

The seventh sending module is configured to send a fourth RRC signaling and a fourth MAC signaling to the terminal. The fourth RRC signaling is configured to indicate a plurality of pieces of beam group information, and each piece of beam group information includes a beam group identifier and a plurality of RS identifiers in the group of beams. Each of the plurality of RS identifiers is configured to indicate a respective beam in the group of beams. The fourth MAC signaling is configured to indicate beam group identifiers of a plurality groups of beams that are to be activated among groups of beams indicated by the fourth RRC signaling.

The terminal determines the plurality of target beams or the target group of beams according to the beam indication signaling, and performs multi-beam based data transmission with the base station based on the plurality of target beams. Since a plurality of target beams are determined by the terminal based on the beam indication signaling, multi-beam based data transmission can be performed between the terminal and the base station, thereby improving robustness of communication.

Figure 12:
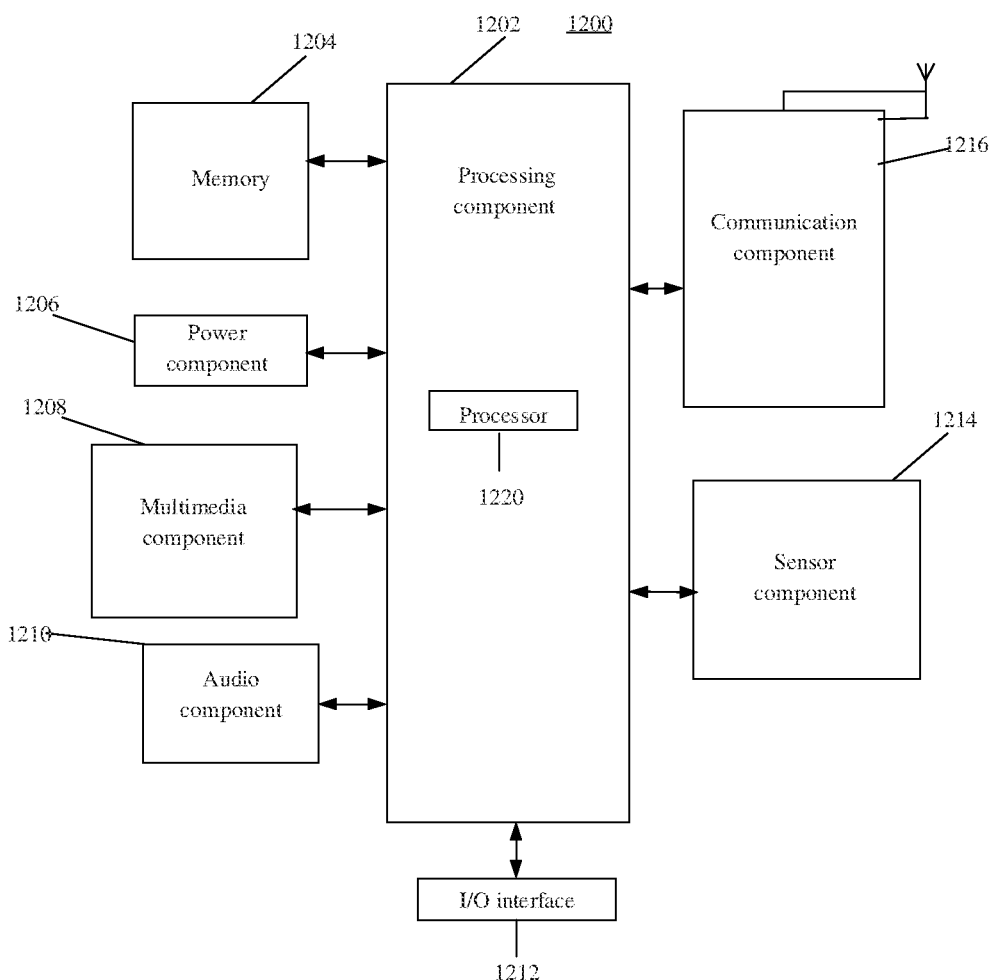
FIG. 12 illustrates a block diagram of another communication apparatus provided in the embodiments of the disclosure.

FIG. 12 illustrates a block diagram of a communication apparatus 1200 according to an embodiment of the disclosure. For example, the apparatus 1200 may be a mobile phone, a computer, a digital broadcast terminal, a messaging device, a gaming console, a tablet, a medical device, exercise equipment, a personal digital assistant, etc.

Referring to FIG. 12, the apparatus 1200 may include one or more of the following components: a processing component 1202, a memory 1204, a power supply component 1206, a multimedia component 1208, an audio component 1210, an Input/Output (I/O) interface 1212, a sensor component 1214, and a communication component 1216.

The processing component 1202 generally controls the overall operation of the apparatus 1200, such as operations associated with display, telephone calls, data communications, camera operations, and recording operations. The processing component 1202 may include one or more processors 1220 to execute instructions to perform all or some of the operations of the above-mentioned method. Moreover, the processing component 1202 may include one or more modules to facilitate the interaction between the processing component 1202 and the other components. For example, the processing component 1202 may include a multimedia module to facilitate interaction between the multimedia component 1208 and the processing component 1202.

The memory 1204 is configured to store various types of data to support the operation of the apparatus 1200. Examples of these data include instructions for any application or method operating on the apparatus 1200, contact data, phone book data, messages, pictures, videos, etc. The memory 1204 may be implemented by any type of volatile or non-volatile storage devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the apparatus 1200. The power component 1206 may include a power management system, one or more power supplies, and other components associated with generation, management and distribution of power for the apparatus 1200.

The multimedia component 1208 includes a screen providing an output interface between the apparatus 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes, and gestures on the TP. The touch sensors may not only sense the boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the apparatus 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a microphone (MIC), and the MIC is configured to receive an external audio signal when the apparatus 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a start button and a lock button.

The sensor component 1214 includes one or more sensors configured to provide state assessment in various aspects for the apparatus 1200. For example, the sensor component 1214 may detect an on/off state of the apparatus 1200 and relative positioning of components, such as a display and small keyboard of the apparatus 1200, and the sensor component 1214 may further detect a change in position of the apparatus 1200 or a component of the apparatus 1200, presence or absence of contact between the user and the apparatus 1200, orientation or acceleration/deceleration of the apparatus 1200 and a change in temperature of the apparatus 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and another device. The apparatus 1200 may access a communication specification based wireless network, such as a Wireless Fidelity (WiFi) network, a $2^{nd}$-Generation (2G) or $3^{rd}$-Generation (3G) network or a combination thereof. In the embodiments of the disclosure, the communication component 1216 receives a broadcast signal or broadcast associated information from an external broadcast management system through a broadcast channel. In the embodiments of the disclosure, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a bluetooth (BT) technology and another technology.

In the embodiments of the disclosure, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In the embodiments of the disclosure, there is also provided a non-transitory computer-readable storage medium including instructions, such as the memory 1204 including instructions, and the instructions may be executed by the processor 1220 of the apparatus 1200 to implement the above-mentioned method. For example, the non-transitory computer-readable storage medium may be a ROM, a RAM, a CD-ROM, a magnetic tape, a floppy disc, an optical data storage device and the like.

Figure 13:
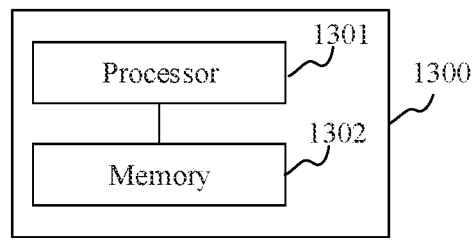
FIG. 13 illustrates a block diagram of another communication apparatus provided in the embodiments of the disclosure.

FIG. 13 illustrates a schematic structural diagram of a base station provided in the embodiments of the disclosure. The base station 1300 may be greatly different due to different configurations or performance, and may include one or more processors (such as Central Processing Units (CPUs)) 1301 and one or more memories 1302. At least one instruction is stored in the memory 1302, and the at least one instruction is loaded and executed by the processor 1301 to implement the methods provided in the foregoing method embodiments. Of course, the base station may also have components such as a wired or wireless network interface, a keyboard, an input and output interface, and the base station may also include other components for implementing device functions, which will not be repeated here.

The embodiments of the disclosure further provide a computer-readable storage medium. The computer-readable storage medium is applied to a terminal, the computer-readable storage medium stores at least one instruction, at least one program, a code set or an instruction set that is loaded and executed by the processor to implement the operations performed by the terminal in the communication method of the above-mentioned embodiments.

The embodiments of the disclosure further provide a computer-readable storage medium, the computer-readable storage medium is applied to a base station, the computer-readable storage medium stores at least one instruction, at least one program, a code set or an instruction set that is loaded and executed by the processor to implement the operations performed by the base station in the communication method of the above-mentioned embodiments.

The skilled person in the art can understand that all or part of the operations in the above-mentioned embodiments may be implemented by hardware, or by a program instructing related hardware. The program may be stored in a computer-readable storage medium, and the storage medium mentioned may be a read-only memory, a magnetic disk or an optical disk, etc.

What is claimed is:

1. A communication method, performed by a base station, the method comprising:
   determining a plurality of target beams or a target group of beams for multi-beam transmission with a terminal;
   generating a beam indication signaling according to the plurality of target beams or the target group of beams, wherein the beam indication signaling is configured to indicate the plurality of target beams or the target group of beams;
   sending the beam indication signaling to the terminal, wherein the beam indication signaling is configured for the terminal to determine the plurality of target beams or the target group of beams, and is configured for the terminal to perform multi-beam based data transmission with the base station based on the plurality of target beams or the target group of beams; and
   after sending the beam indication signaling to the terminal, performing data transmission with the terminal, and in a case that the data transmission is performed within a preset duration since the beam indication signaling is sent, sending a first group of beams or one or more first beams to the terminal, the first group of beams or the one or more first beams being determined as a default target group of beams or one or more default target beams by the terminal.

2. The method according to claim 1, wherein the beam indication signaling is a first medium access control (MAC) signaling, and the first MAC signaling is configured to indicate a beam group identifier of the target group of beams that are to be activated.

3. The method according to claim 2, wherein before sending the beam indication signaling to the terminal, the method further comprises:
   sending, by the base station, a first radio resource control (RRC) signaling to the terminal, wherein the first RRC signaling is configured to indicate a plurality of pieces of beam group information, each piece of beam group information comprises a beam group identifier and a plurality of reference signal (RS) identifiers in a group of beams, and each of the plurality of RS identifiers is configured to indicate a respective beam in the group of beams.

4. The method according to claim 1, wherein the beam indication signaling is a second MAC signaling, and the second MAC signaling is configured to indicate beam identifiers of the plurality of target beams that are to be activated.

5. The method according to claim 4, wherein before sending the beam indication signaling to the terminal, the method further comprises:
   sending, by the base station, a second RRC signaling to the terminal, wherein the second RRC signaling is configured to indicate a plurality of pieces of beam information, each piece of beam information comprises a beam identifier and an RS identifier corresponding to a beam, and the RS identifier is configured to indicate the beam.

6. The method according to claim 1, wherein the beam indication signaling is a first downlink control information (DCI) signaling configured to indicate beam identifiers of the plurality of target beams.

7. The method according to claim 6, wherein before sending the beam indication signaling to the terminal, the method further comprises:
   sending, by the base station, a third RRC signaling to the terminal, wherein the third RRC signaling is configured to indicate a plurality of pieces of beam information, each piece of beam information comprises a beam identifier and an RS identifier corresponding to a beam, and the RS identifier is configured to indicate the beam.

8. The method according to claim 6, wherein before sending the beam indication signaling to the terminal, the method further comprises:
   sending, by the base station, a third RRC signaling and a third MAC signaling to the terminal, wherein the third RRC signaling is configured to indicate a plurality of pieces of beam information, each piece of beam information comprises a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling.

9. The method according to claim 1, wherein the beam indication signaling is a second DCI signaling configured to indicate a beam group identifier of the target group of beams.

10. The method according to claim 9, wherein before sending the beam indication signaling to the terminal, the method further comprises:
sending, by the base station, a fourth RRC signaling to the terminal, wherein the fourth RRC signaling is configured to indicate a plurality of pieces of beam group information, each piece of beam group information comprises a beam group identifier and a plurality of RS identifiers in a group of beams, and each of the plurality of RS identifiers is configured to indicate a respective beam in the group of beams.

11. The method according to claim 9, wherein before sending the beam indication signaling to the terminal, the method further comprises:
sending, by the base station, a fourth RRC signaling and a fourth MAC signaling to the terminal, wherein the fourth RRC signaling is configured to indicate a plurality of pieces of beam group information, each piece of beam group information comprises a beam group identifier and a plurality of RS identifiers in a group of beams, each of the plurality of RS identifiers is configured to indicate a respective beam in the group of beams, and the fourth MAC signaling is configured to indicate beam group identifiers of a plurality groups of beams that are to be activated among groups of beams indicated by the fourth RRC signaling.

12. A base station, comprising:
a processor; and
a memory configured to store processor-executable instructions;
wherein the processor is configured to:
determine a plurality of target beams or a target group of beams for multi-beam transmission with a terminal;
generate a beam indication signaling according to the plurality of target beams or the target group of beams, wherein the beam indication signaling is configured to indicate the plurality of target beams or the target group of beams;
send the beam indication signaling to the terminal, wherein the beam indication signaling is configured for the terminal to determine the plurality of target beams or the target group of beams, and is configured for the terminal to perform multi-beam based data transmission with the base station based on the plurality of target beams or the target group of beams; and
perform data transmission with the terminal, and in a case that the data transmission is performed within a preset duration since the beam indication signaling is sent, send a first group of beams or one or more first beams to the terminal, the first group of beams or the one or more first beams being determined as a default target group of beams or one or more default target beams by the terminal.

13. The base station according to claim 12, wherein the beam indication signaling is a first medium access control (MAC) signaling configured to indicate a beam group identifier of the target group of beams that are to be activated.

14. The base station according to claim 13, wherein the processor is further configured to:
send a first radio resource control (RRC) signaling to the terminal, wherein the first RRC signaling is configured to indicate a plurality of pieces of beam group information, each piece of beam group information comprises a beam group identifier and a plurality of reference signal (RS) identifiers in the group of beams, and each of the plurality of RS identifiers is configured to indicate a respective beam in the group of beams.

15. The base station according to claim 12, wherein the beam indication signaling is a second MAC signaling configured to indicate beam identifiers of the plurality of target beams that are to be activated.

16. The base station according to claim 15, wherein the processor is further configured to:
send a second RRC signaling to the terminal, wherein the second RRC signaling is configured to indicate a plurality of pieces of beam information, each piece of beam information comprises a beam identifier and an RS identifier corresponding to a beam, and the RS identifier is configured to indicate the beam.

17. The base station according to claim 12, wherein the beam indication signaling is a first downlink control information (DCI) signaling configured to indicate beam identifiers of the plurality of target beams.

18. The base station according to claim 17, wherein the processor is further configured to:
send a third RRC signaling to the terminal, wherein the third RRC signaling is configured to indicate a plurality of pieces of beam information, each piece of beam information comprises a beam identifier and an RS identifier corresponding to a beam, and the RS identifier is configured to indicate the beam.

19. The base station according to claim 17, wherein the processor is further configured to:
send a third RRC signaling and a third MAC signaling to the terminal, wherein the third RRC signaling is configured to indicate a plurality of pieces of beam information, each piece of beam information comprises a beam identifier and an RS identifier corresponding to a beam, the RS identifier is configured to indicate the beam, and the third MAC signaling is configured to indicate beam identifiers of a plurality of beams that are to be activated among a plurality of beam identifiers indicated by the third RRC signaling.

20. The base station according to claim 12, wherein the beam indication signaling is a second DCI signaling configured to indicate a beam group identifier of the target group of beams.

* * * * *